(12) United States Patent
Lavalley et al.

(10) Patent No.: US 10,344,892 B2
(45) Date of Patent: Jul. 9, 2019

(54) PIPE PROCESSING TOOL WITH PIPE DEFORMATION MEMBERS

(71) Applicant: LAVALLEY INDUSTRIES, LLC, Bemidji, MN (US)

(72) Inventors: Jason Lavalley, Bemidji, MN (US); Daniel Larson, Bagley, MN (US); Jesse Kilde, Blackduck, MN (US)

(73) Assignee: LAVALLEY INDUSTRIES, LLC, Bemidji, MN (US)

( * ) Notice: Subject to any disclaimer, the term of this patent is extended or adjusted under 35 U.S.C. 154(b) by 411 days.

(21) Appl. No.: 14/608,883

(22) Filed: Jan. 29, 2015

(65) Prior Publication Data

US 2015/0300529 A1    Oct. 22, 2015

Related U.S. Application Data

(62) Division of application No. 14/255,028, filed on Apr. 17, 2014, now Pat. No. 8,973,244.

(51) Int. Cl.
*B21D 3/14* (2006.01)
*F16L 1/06* (2006.01)
(Continued)

(52) U.S. Cl.
CPC .............. *F16L 1/036* (2013.01); *B21D 19/10* (2013.01); *B21D 39/04* (2013.01); *B21D 39/048* (2013.01);
(Continued)

(58) Field of Classification Search
CPC ..... F16L 1/036; F16L 1/10; F16L 1/06; F16L 1/09; B21D 39/048; B21D 39/04;
(Continued)

(56) References Cited

U.S. PATENT DOCUMENTS 3,231,303 A   1/1966   LeTourneau
3,561,615 A   2/1971   Forsberg et al.
(Continued)

FOREIGN PATENT DOCUMENTS

CA   2641321   4/2009
DE   295 02 091 U1   4/1995
(Continued)

OTHER PUBLICATIONS

Kwang et al. KR 2012 0033519 Machine Translation.*
(Continued)

*Primary Examiner* — David P Bryant
*Assistant Examiner* — Lee A Holly
(74) *Attorney, Agent, or Firm* — Hamre, Schumann, Mueller & Larson, P.C.

(57) ABSTRACT

A pipe processing tool that is configured to deform the end of a pipe so that the circumferential shape of the end of the pipe generally matches the circumferential shape of an adjacent pipe end. Matching the circumferential shapes of the pipe ends is advantageous during a pipe attachment process. The pipe processing tool can include a deformation ring with a plurality of pipe deformation members. Each pipe deformation member faces radially inward and is actuatable in a radial direction toward and away from the center of the deformation ring in order to permit engagement with the pipe. Each pipe deformation member is individually and separately actuatable from the other pipe deformation members so that the circumferential shapes of the pipes can be altered by controlling suitable ones of the pipe deformation members.

20 Claims, 25 Drawing Sheets

(51) Int. Cl.
| | | |
|---|---|---|
| F16L 1/09 | (2006.01) | |
| F16L 1/10 | (2006.01) | |
| B21D 19/10 | (2006.01) | |
| B21D 39/04 | (2006.01) | |
| B23K 37/02 | (2006.01) | |
| B23K 101/06 | (2006.01) | |
| F16L 1/036 | (2006.01) | |
| B23K 37/053 | (2006.01) | |
| B23K 31/02 | (2006.01) | |
| B23K 101/10 | (2006.01) | |
| B23K 103/04 | (2006.01) | |

(52) U.S. Cl.
CPC ............ *B23K 31/02* (2013.01); *B23K 37/027* (2013.01); *B23K 37/0217* (2013.01); *B23K 37/0276* (2013.01); *B23K 37/0282* (2013.01); *B23K 37/0288* (2013.01); *B23K 37/0533* (2013.01); *F16L 1/06* (2013.01); *F16L 1/09* (2013.01); *F16L 1/10* (2013.01); *B21D 3/14* (2013.01); *B23K 2101/06* (2018.08); *B23K 2101/10* (2018.08); *B23K 2103/04* (2018.08); *Y10T 29/4978* (2015.01); *Y10T 29/49838* (2015.01); *Y10T 29/49861* (2015.01); *Y10T 29/49902* (2015.01); *Y10T 29/49906* (2015.01); *Y10T 29/5185* (2015.01)

(58) Field of Classification Search
CPC .... B21D 19/10; B23K 31/02; B23K 37/0217; B23K 37/027; B23K 2203/04; B23K 2201/06; B23K 2201/10; B23K 37/0282; B23K 37/0288; B23K 37/0533; Y10T 29/49906; Y10T 29/49861; Y10T 29/49902; Y10T 29/49838; Y10T 29/5185
See application file for complete search history.

(56) References Cited

U.S. PATENT DOCUMENTS

| | | | |
|---|---|---|---|
| 3,719,296 A | 3/1973 | Larson, Jr. | |
| 3,727,653 A | 4/1973 | Tucek | |
| 3,748,426 A * | 7/1973 | Stanley | ................ B23K 9/0286 219/125.1 |
| 4,035,010 A | 7/1977 | Kawashita et al. | |
| 4,486,136 A | 12/1984 | Howard | |
| 4,810,019 A | 3/1989 | Brucher | |
| 4,858,979 A | 8/1989 | Parma | |
| 5,219,265 A | 6/1993 | Recker | |
| 5,607,251 A | 3/1997 | Rafn | |
| 5,975,604 A | 11/1999 | Wolin et al. | |
| 6,024,145 A | 2/2000 | Ackles | |
| 6,176,531 B1 | 1/2001 | Wheeler | |
| 6,220,807 B1 | 4/2001 | Sorokan | |
| 6,840,433 B2 * | 1/2005 | Vermaat | ............. B23K 37/0533 228/212 |
| 7,066,076 B2 | 6/2006 | Roy et al. | |
| 7,357,163 B2 | 4/2008 | Wager | |
| 8,328,071 B2 | 12/2012 | LaValley et al. | |
| 8,490,519 B2 | 7/2013 | LaValley et al. | |
| 8,590,769 B2 | 11/2013 | LaValley et al. | |
| 2002/0153406 A1 | 10/2002 | Vermaat | |
| 2007/0013199 A1 | 1/2007 | Hall et al. | |
| 2007/0256288 A1 | 11/2007 | Vermaat | |
| 2008/0029578 A1 | 2/2008 | Steel et al. | |
| 2009/0057019 A1 | 3/2009 | LaValley et al. | |
| 2009/0155040 A1 | 6/2009 | Martin | |
| 2010/0308609 A1 | 12/2010 | LaValley et al. | |
| 2012/0074205 A1* | 3/2012 | Dagenais | ........... B23K 37/0533 228/102 |
| 2012/0174372 A1 | 7/2012 | Dagenais | |
| 2012/0297933 A1* | 11/2012 | Lavalley | ................ E02F 3/965 81/57.34 |
| 2014/0028038 A1 | 1/2014 | LaValley et al. | |
| 2014/0042207 A1 | 2/2014 | LaValley et al. | |

FOREIGN PATENT DOCUMENTS

| | | |
|---|---|---|
| DE | 102 06 645 A1 | 8/2003 |
| EP | 1870372 | 12/2007 |
| FI | 941990 | 10/1995 |
| KR | 20120033519 A * | 4/2012 |
| WO | 2000/053522 | 9/2000 |
| WO | 00/65193 A1 | 11/2000 |
| WO | 2003/082725 | 10/2003 |
| WO | 2007/097698 | 8/2007 |
| WO | 2008/076067 | 6/2008 |
| WO | 2009/029879 | 3/2009 |

OTHER PUBLICATIONS

International Search Report and Written Opinion for International Application No. PCT/US2015/024852, dated Jul. 14, 2015, 17 pgs.
Indexator Rototilt® print outs from www.indexatornorthamerica.com/index.php, printed on Sep. 8, 2011; 1 page.
Prentice Grapples specification sheet; printed Sep. 8, 2011 from http://prenticecranes.com/prentice-grapples.html; 6 sheets.
Prentice 2410-2414 Knuckleboom Loaders; printed Sep. 8, 2011 from http://prenticecranes.com/prentice-2410-2414-knuckleboom-loaders.html; 6 sheets.
"Manipulator KM 930," Kinshofer GmbH, available at http://www.kinshofer.com/site_eng/produkte_main/main_km930.html; printed May 13, 2010; 1 page.
"Manipulator KM 930," Kinshofer Gmbh, available at http://www.kinshofer.com/site_eng/produkte_main/Resources/KM_930_eng.pdf ; printed May 13, 2010; 1 page.
"Selling GB Wood Grapple products," GB Industries Co. Ltd, available at http://kennycho.trustpass.alibaba.com/product/107764499-11334694/Selling_GB_Wood_Grapple_products.html ; printed May 13, 2010; 3 pages.
"Selector/Demolition Grabs," McQuaid Engineering Ltd, available at http://www.alibaba.com/product/mcquaid84-215959236-0/Selector_Demolition-Grabs.html ; printed May 13, 2010; 3 pages.
"Kinshofer Manipulators—Kinshofer-KM930," available at http://www.worktruck-outfitters.com/kinshofer-manipulators-p-1281.html ; printed May 13, 2010; 4 pages.
Drawings and Photographs of a Grapple manufactured by Weldco Beales MFG.; in Applicants possession on or about Mar. 20, 2010; 15 pages.
Pictures of a grapple mechanism printed from http://rotobec.com/web/2610_PH_Pipe_and_Pole-Handler.html and http://rotobec.com/resources/images/products/rotations/RGP-252_main.jpg on Mar. 30, 2010, but possibly posted on the Internet as early as Sep. 2009; 2 pages.
Five photographs taken in Jan. 2010 of a grapple mechanism used by Michels Corporation.
Photograph of Manipulator manufactured by Kinshofer GmbH of Germany (1 page).
Drawings of Heavy Duty Pole Claw manufactured by EZ-Spot-UR, dated Apr. 29, 2010, found online at http://www.ezspotur.com/HDPC-01-0006_NO_SETBACK.pdf (1 page).
Office Action issued in Canadian application No. 2945789, dated Jun. 1, 2017, total 3 pages.
Extended European Search Report in European Application No. 15779600.4; dated Nov. 24, 2017; 8 pages.

* cited by examiner

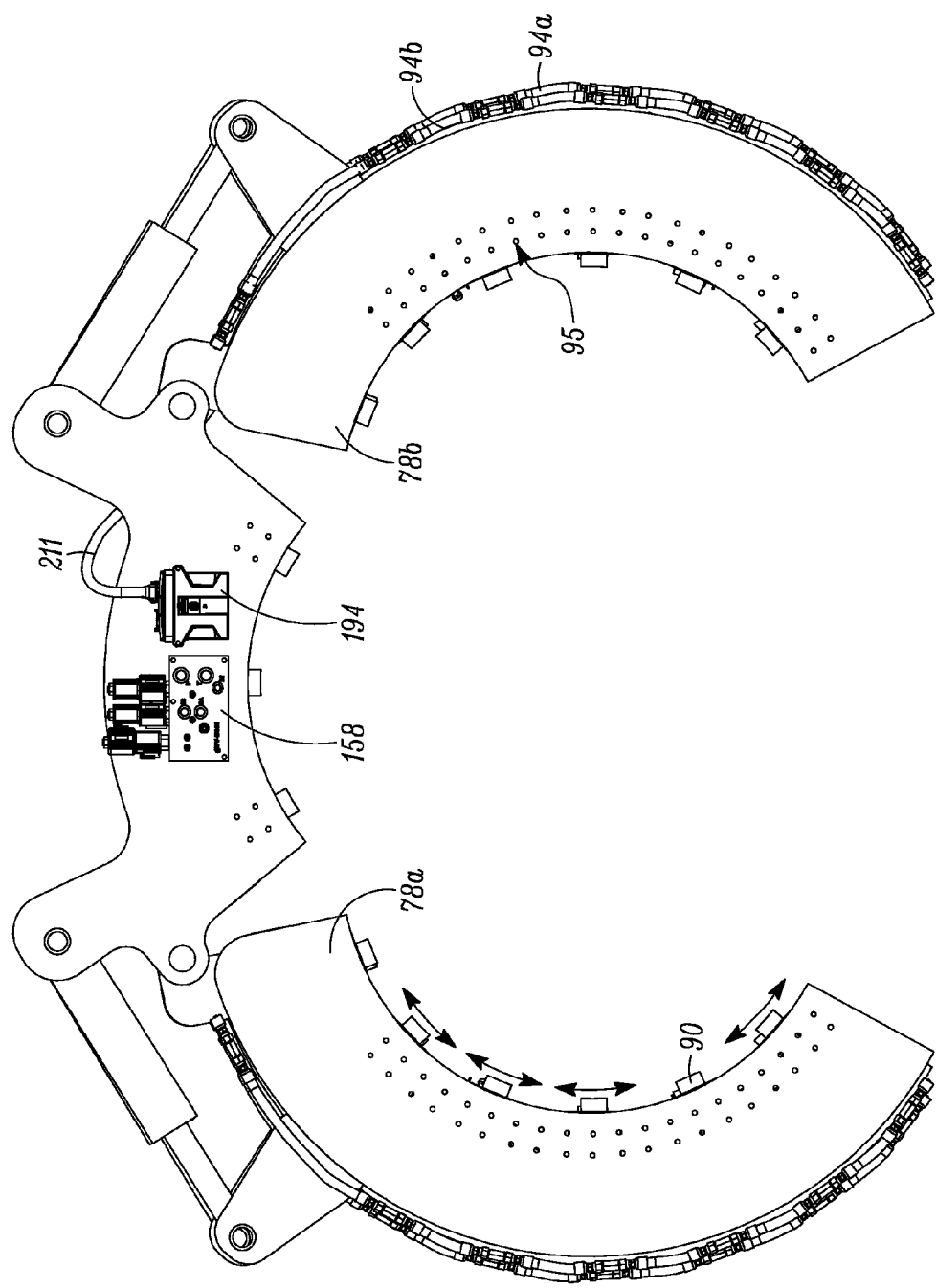

PIPE PROCESSING TOOL WITH PIPE DEFORMATION MEMBERS

FIELD

This disclosure relates to positioning pipe and pipe ends to join the pipe ends together and performing processing operations on the pipe or pipe ends.

BACKGROUND

Positioning two large diameter pipes, such as oilfield pipes, for fastening the pipes to one another is extremely time consuming and can take many hours and require many workers and millions of dollars worth of equipment which is very costly and slows down the production of the pipeline. In addition, the current process is hazardous to the workers. One technique for improving the pipe attachment process is described in U.S. Pat. No. 8,328,071.

Any reduction in the time and cost it takes to make a connection between pipe is beneficial. In addition, improving the safety to ground workers would be beneficial.

SUMMARY

A pipe processing tool is described that is configured to deform the end of a pipe so that the circumferential shape (for example, the circularity) of the end of the pipe generally matches the circumferential shape (for example, the circularity) of an adjacent pipe end. Matching the circumferential shapes of the pipe ends is advantageous during a pipe fastening process, where the ends of the two pipes need to be aligned with and matched to one another for welding or other securement of the ends together.

In the pipeline industry, stringing pipe is typically defined as laying pipe end to end in preparation to be welded together. Set up is typically defined as welding the pipe ends together above ground one joint at a time after the pipe stringing. Lower in is typically defined as, once pipe is welded together above ground, lowering the pipe into a trench. Tie-in is typically defined as being when two pipes are welded or otherwise secured to one another while in a trench.

This application describes a system and method that can perform stringing of pipe, set up pipe, lower in of pipe, and pipe tie-in. Stringing pipe, set up of pipe, lower in of pipe and pipe tie-in will be collectively referred to herein as a pipe laying process and is intended to encompass any one of these individual processes or encompass each of these processes, whether above ground or in a trench. The process of attaching one end of a pipe to another end of a pipe, whether during set up above ground or in a tie-in operation while in a trench, will be referred to as a pipe attachment process or the like and is intended to encompass attachment during set up, during tie-in, or attachment during any other process.

A system and method are also described wherein the alignment of the ends of the two pipes, and one or more pipe processing operations such as welding the ends of the pipes together during a pipe attachment process, can be manually controlled by a single operator from the ground close to the pipe attachment operation. Some or all of the alignment process, and some or all of the pipe processing operation(s), can be automated, with the operator able to override the automation to permit manual control.

In one embodiment, one or more sensors, such as laser sensors, detect the circumferential shape of at least one of the pipe ends. The data from the sensors is fed to a control system which in turn uses the data to control the deformation of the pipe end by the pipe processing tool until the circumferential shape of the pipe ends generally match one another.

In another embodiment, sensors detect the circumferential shape of each of the pipe ends so that the control system knows the circumferential shape of each pipe end and can control the deformation applied by the pipe processing tool until the circumferential shapes of the pipe ends generally match one another.

In still another embodiment, the ends of both of the pipes can be deformed by the pipe processing tool in order to generally match the circumferential shapes of the pipe ends.

As used herein, the term "circularity" refers to how close to, or conversely how far from, the shape of the pipe approaches that of a perfect circle. The term "ovality", which is defined as the degree of deviation from perfect circularity, could also be used in place of "circularity". In a more general sense, the pipe processing tool described herein deforms the pipe to change its circumferential shape in some manner, e.g. changes the pipe's "circularity" or "ovality" in the case of circular pipe.

The pipe processing tool can deform one or both pipe ends so that the circumferential shapes of the pipe ends match each other. The pipe end(s) could be deformed in order to make the circumferential shape(s) substantially circular, oval or whatever shape the pipes are supposed to have. Alternatively, one or more of the pipe ends could be deformed to intentionally deviate from their intended shape. For example, one of the pipe ends could have one or more flats so that the circumferential shape of the pipe end deviates from a perfect circle. The other pipe end could be deformed by the pipe processing tool in order to have matching flats so that the circumferential shape matches the other pipe.

Therefore, the pipe processing tool can be used to achieve substantial circularity or the pipe processing tool can be used to intentionally deviate from substantial circularity. In either event, the pipe processing tool deforms the pipe end(s) so that the circumferential shapes of the pipe ends match one another for subsequent welding of the pipe ends.

One embodiment of the pipe processing tool can include a first deformation ring that has a closed configuration and an open configuration. In the closed configuration, the first deformation ring forms a circle that can encircle a first pipe and in the open configuration the first deformation ring can be installed around or removed from the first pipe. A first plurality of pipe deformation members are disposed on, and are circumferentially spaced from one another about, an inner circumference of the first deformation ring. Each of the pipe deformation members faces radially inward toward a center of the first deformation ring when the first deformation ring is in the closed configuration. Each of the pipe deformation members comprises a fluid actuated piston that is actuatable in a radial direction toward and away from the center of the first deformation ring in order to permit engagement with the first pipe. In addition, each pipe deformation member is individually and separately actuatable from the other pipe deformation members so that the circularity of the pipe can be altered by controlling suitable ones of the pipe deformation members.

In another embodiment, the pipe processing tool includes a second one of the deformation rings and plurality of pipe deformation members that in use is disposed around the end of the second pipe.

In an embodiment, the pipe processing tool is mounted on a grapple attachment that in turn is mounted on construction equipment, for example mounted to the arm or "stick" of construction equipment such as an excavator, track hoe, back hoe, or similar prime mover or heavy construction equipment. The operations of the pipe processing tool, the grapple attachment, and the construction equipment can be controlled from the operator's cab of the construction equipment.

In another embodiment, the operations of the pipe processing tool, the grapple attachment, and the construction equipment itself can be controlled from a portable control assembly that can be, for example, manually carried by a user or is otherwise located outside of the operator's cab of the construction equipment. The portable control assembly permits a single operator to manually control a pipe laying process, including aligning the ends of the pipes, deforming the pipe end(s), and welding the ends of the pipes and/or performing other pipe processing operation(s), by being able to control each of the construction equipment, the grapple attachment, and the pipe processing tool from the ground close to the intended pipe laying and attachment to better view the pipe laying and attachment operations.

Some or all of the pipe laying and/or pipe attachment operations can be automated, with the portable control assembly allowing the operator to assume manual control if necessary. For example, the steps of determining the shape of the ends of the pipes, deforming the pipe end(s), and welding the ends together can be automated, but under the supervision of the operator. If the operator desires to override one or more of the automated steps and instead perform the step(s) under manual control, the portable control assembly permits such override.

The portable control assembly can take on any configuration that permits a user to control each of the construction equipment, the grapple attachment, and the pipe processing tool. In one embodiment, a main control assembly can be designed to control the construction equipment and the grapple attachment, while a separate remote control pendent is designed to control at least the pipe processing tool and also the grapple attachment. In an exemplary embodiment, the remote control pendent can be designed as a separate unit from the main control assembly, but can be designed to fit on and be carried by the main control assembly.

DRAWINGS

Figure 11:
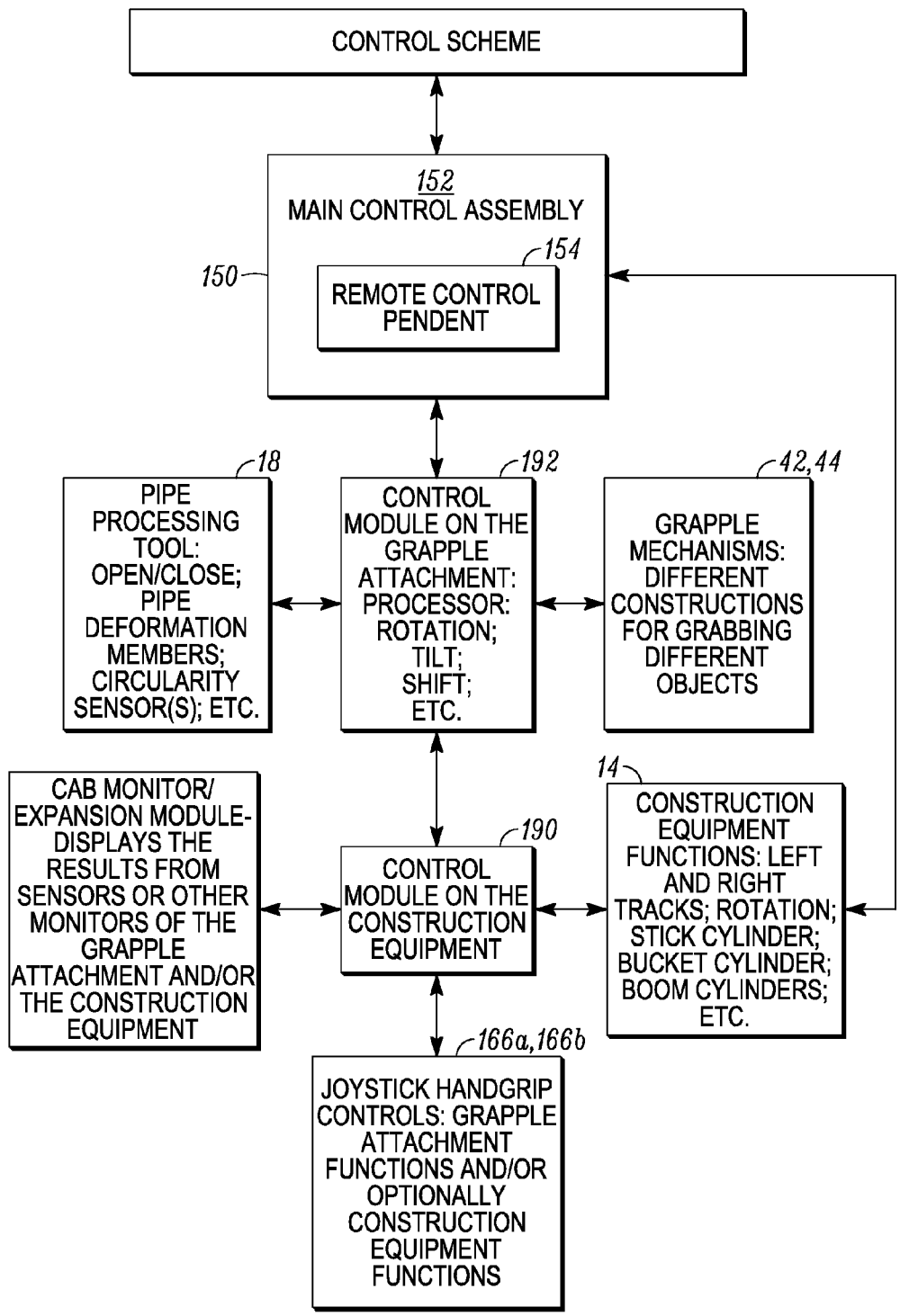

FIG. 11 schematically depicts an exemplary control scheme between the portable control assembly, the construction equipment, the grapple attachment, and the pipe processing tool.

Figure 12:
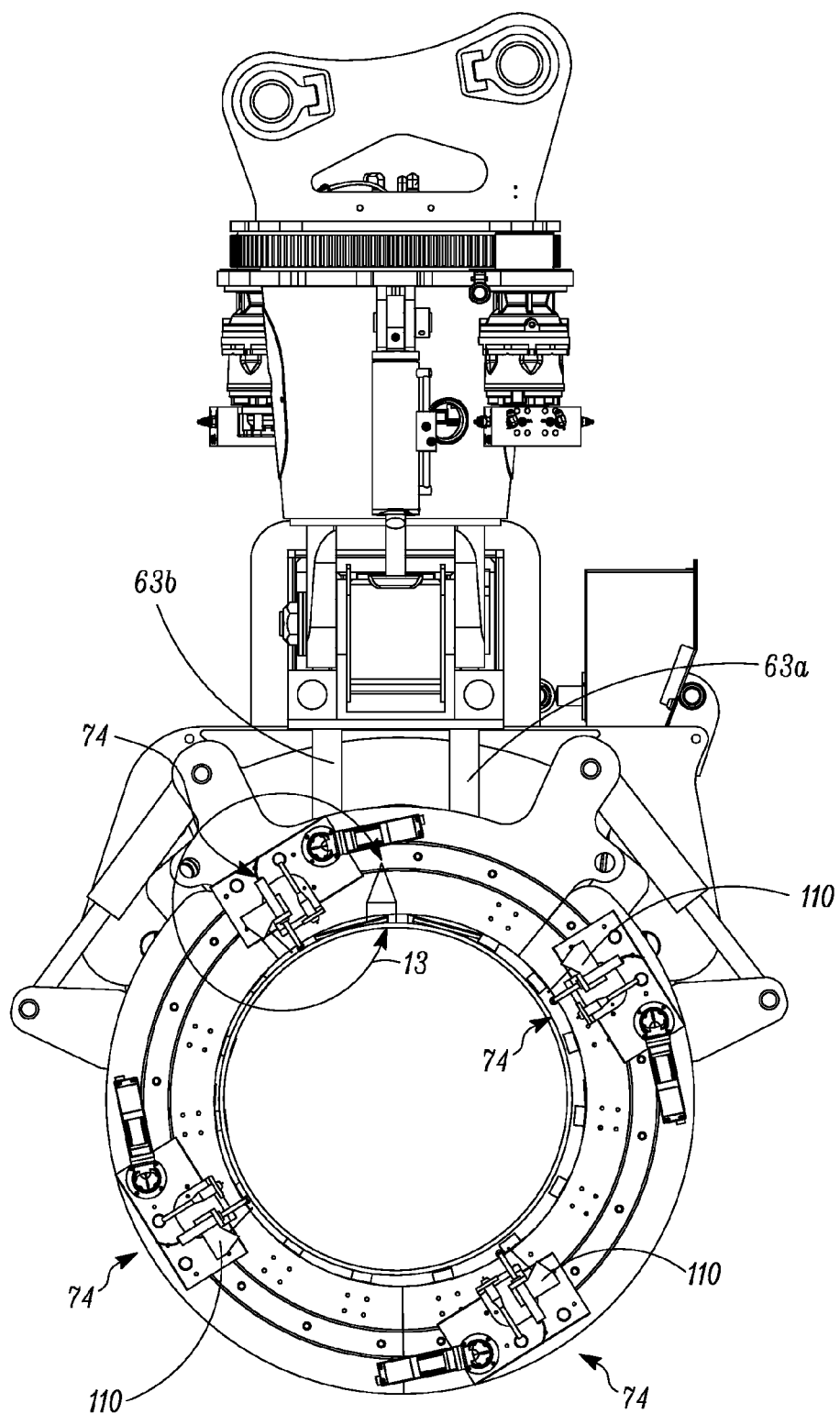

FIG. 12 is a detailed side view of the pipe processing tool that is configured to perform welding.

Figure 13:
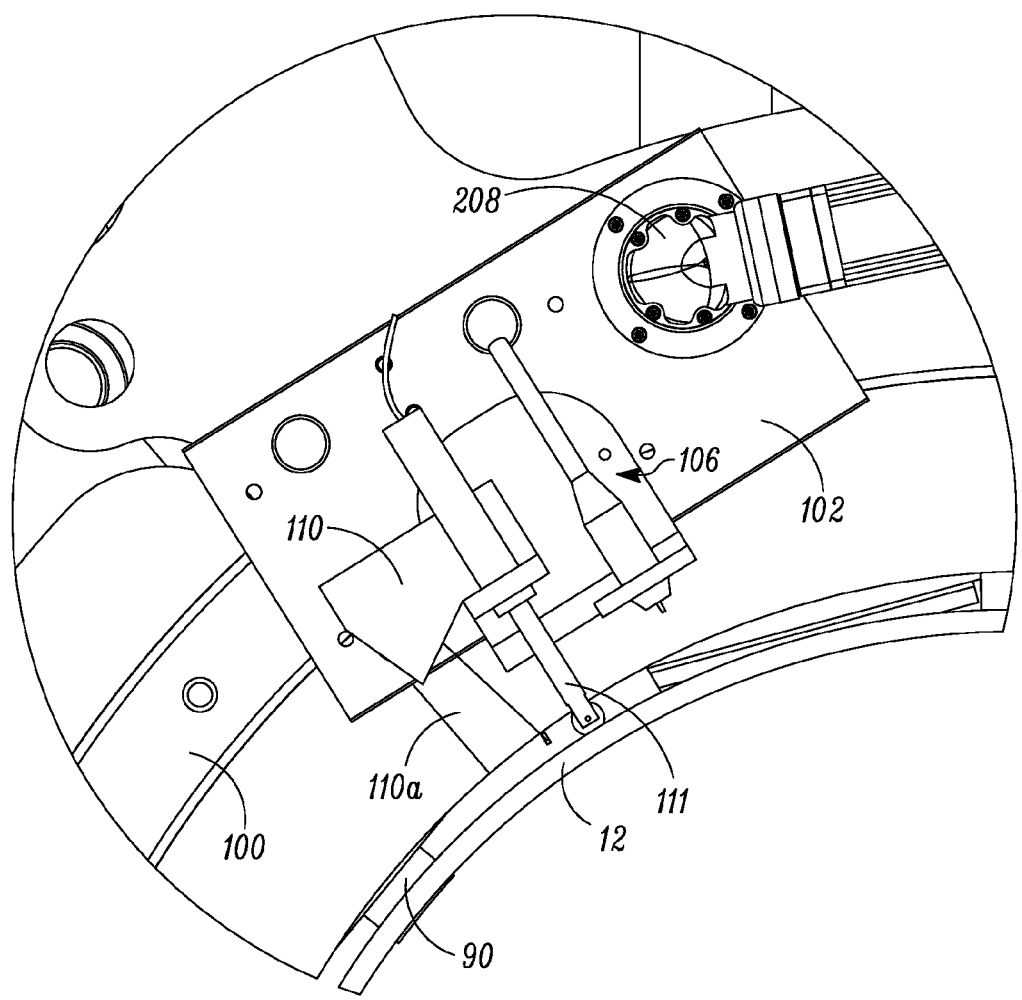

FIG. 13 is a detailed close-up view of the portion contained in the circle 13 in FIG. 12.

Figure 14:
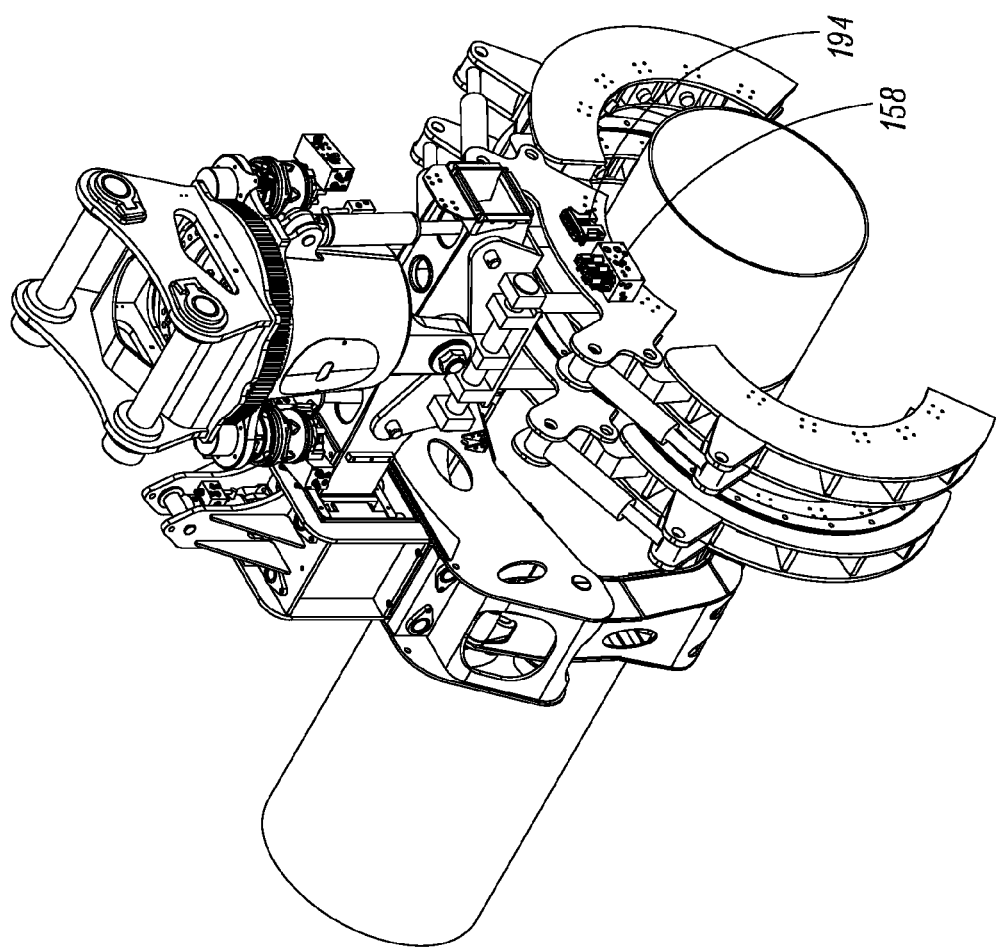

FIG. 14 is a perspective side view of the pipe processing tool illustrating a control module and a manifold.

Figure 15:
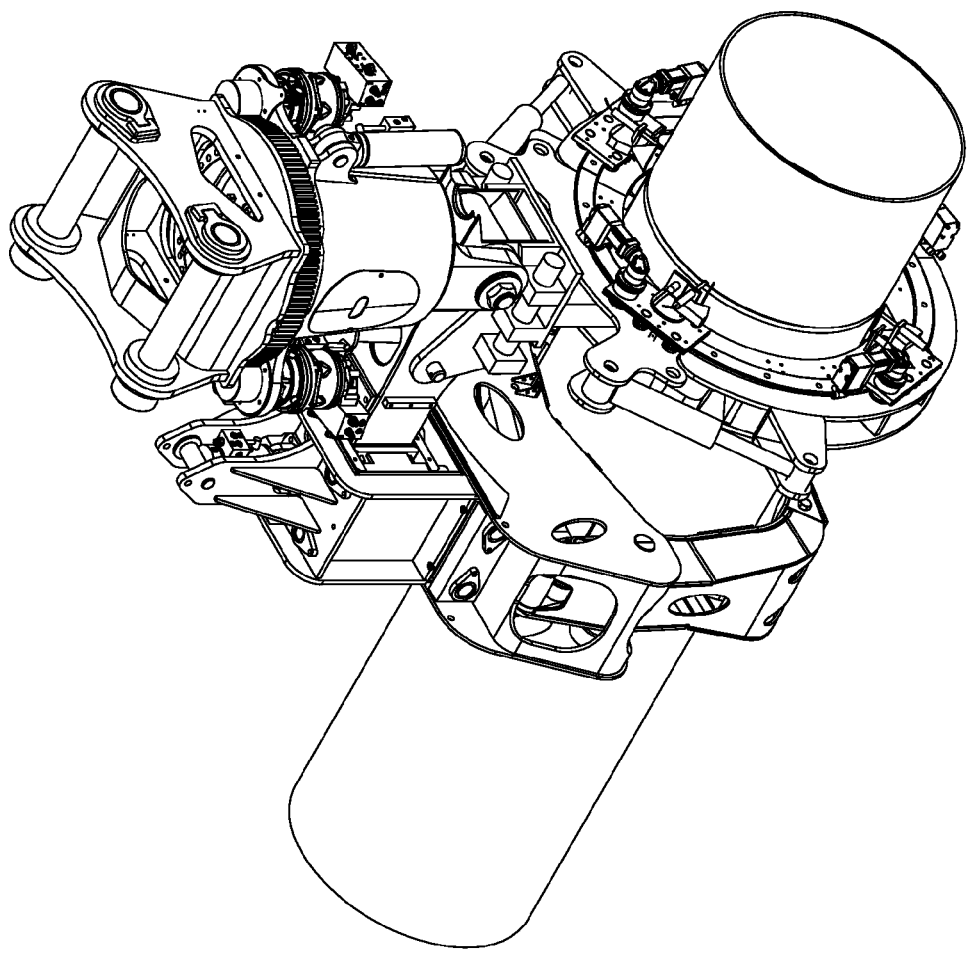

FIG. 15 is a perspective view showing the use of a single pipe processing tool that is configured to perform welding.

Figure 16:
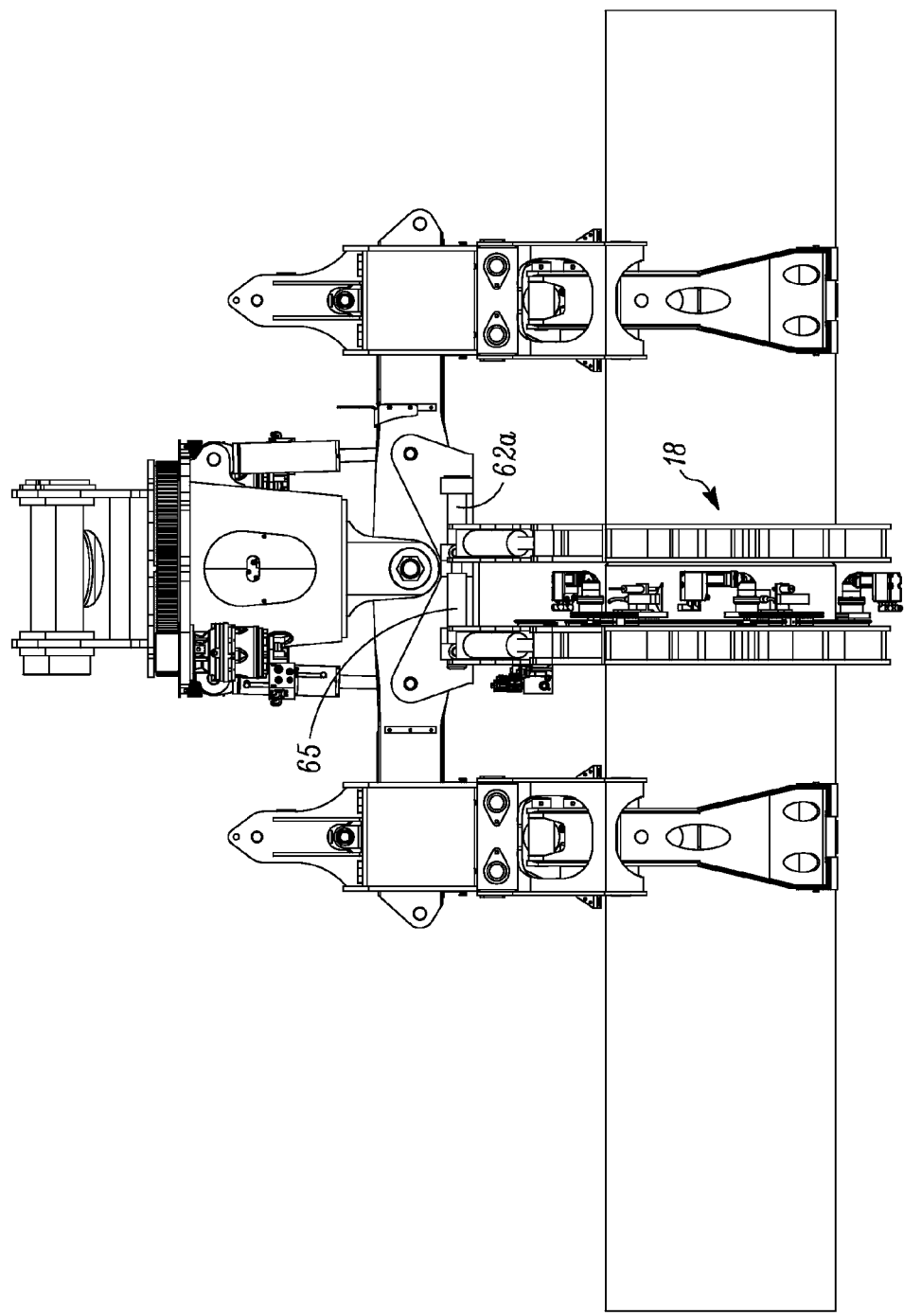

FIG. 16 illustrates the pipe processing tool shifted to the left.

Figure 17:
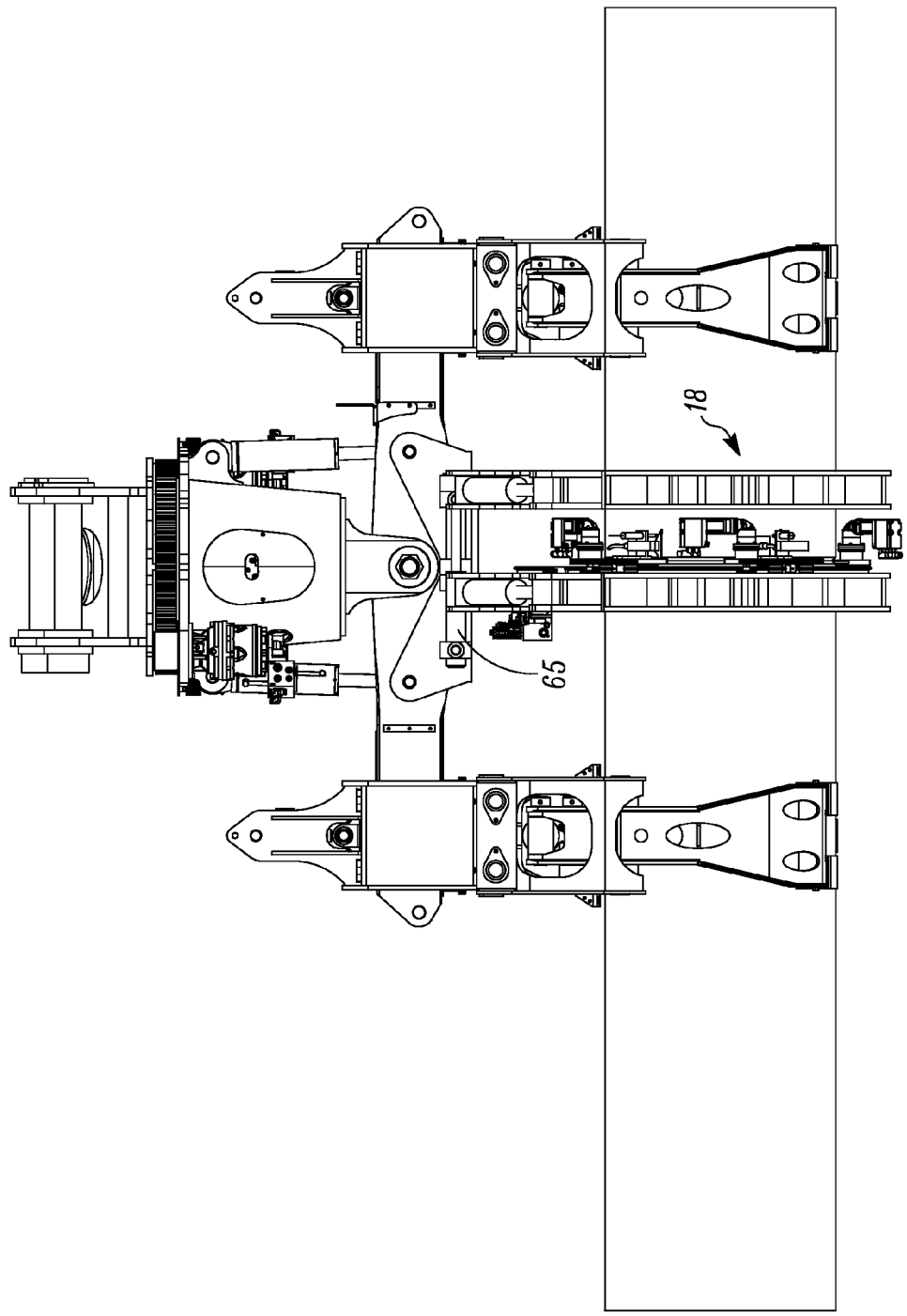

FIG. 17 illustrates the pipe processing tool shifted to the right.

Figure 18:
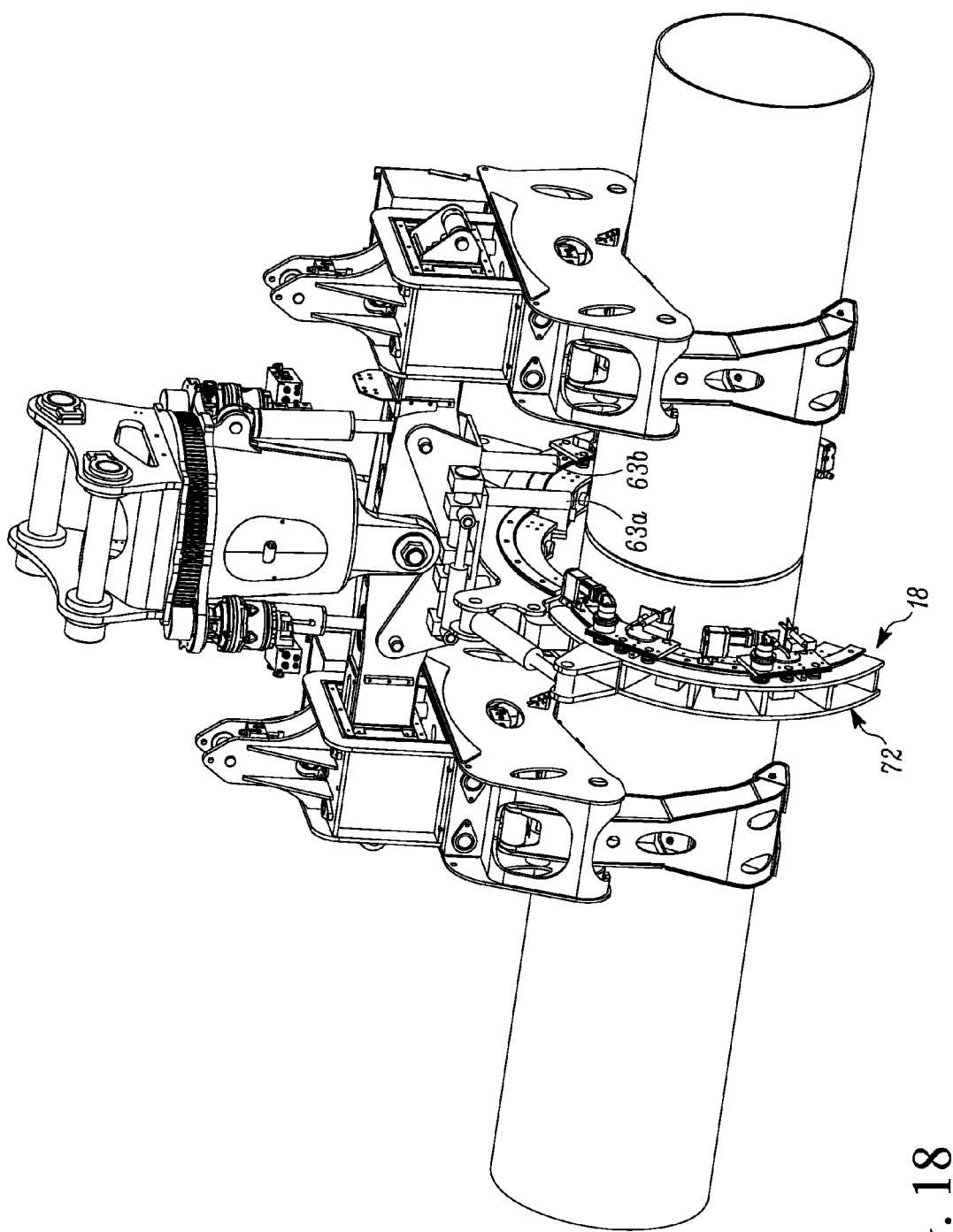

FIG. 18 illustrates the pipe processing tool shifted vertically upward.

Figure 19:
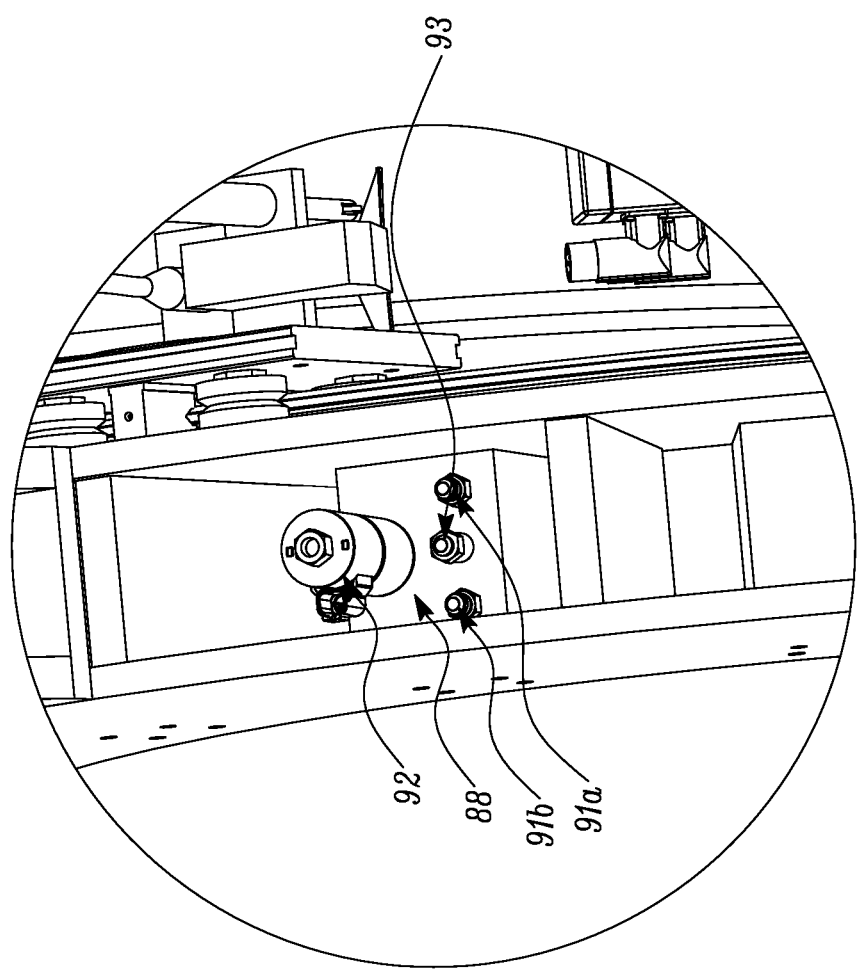

FIG. 19 is a detailed view of one of the pipe deformation members.

Figure 20:
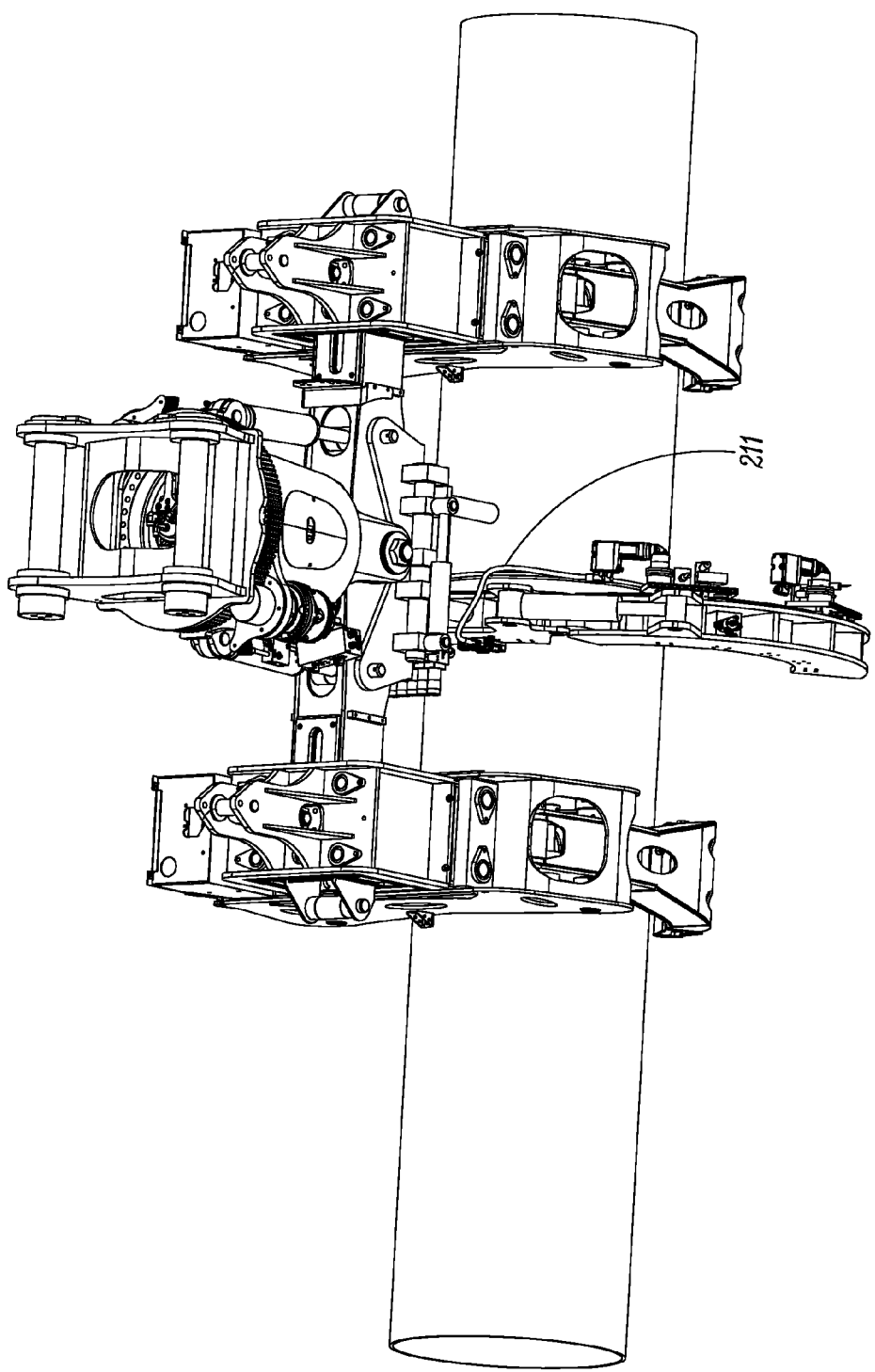

FIG. 20 illustrates a wiring harness from the control module to a motor of one of the pipe processing mechanisms.

Figure 21:
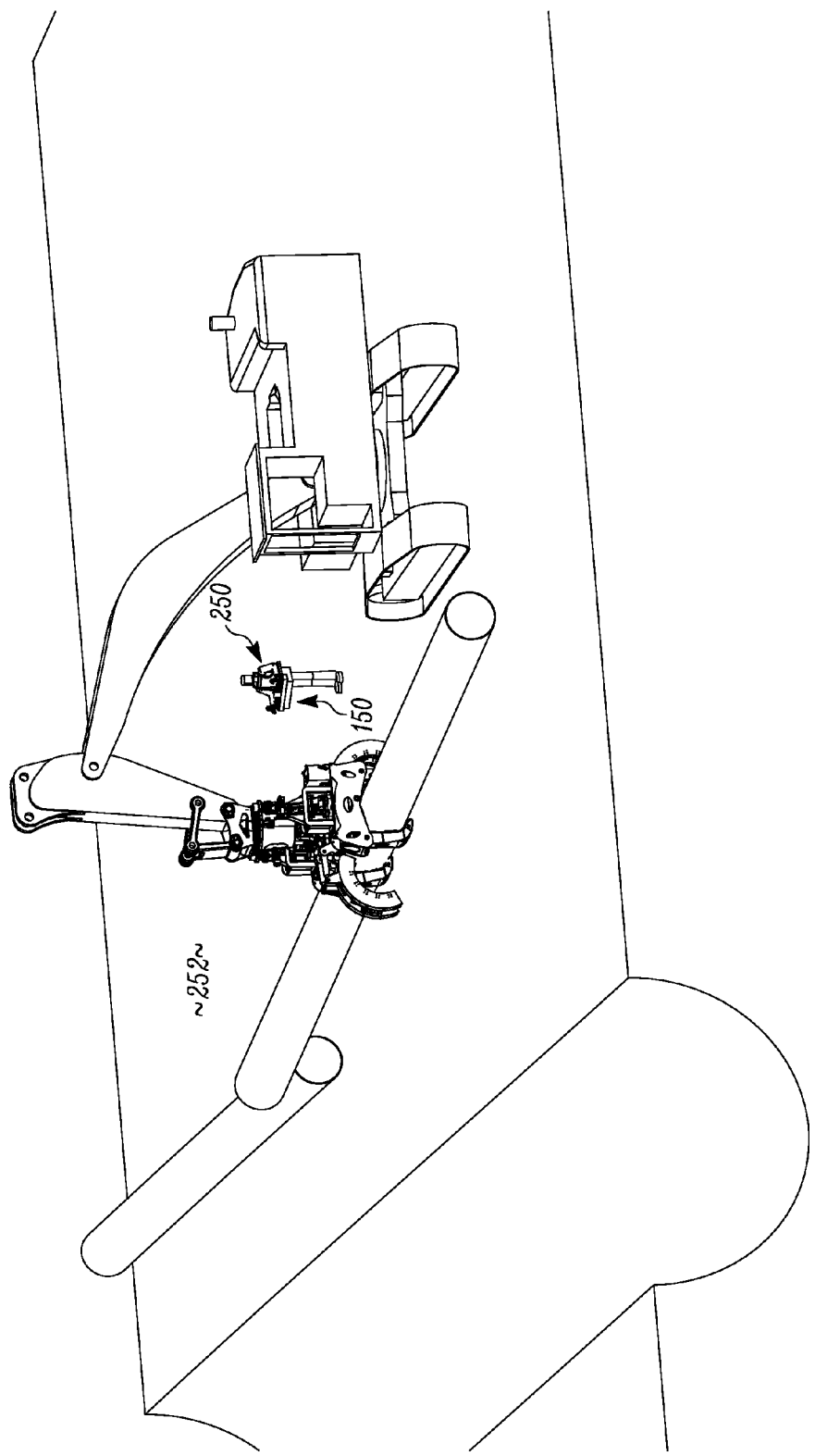

FIG. 21 illustrates an operator controlling the construction equipment and the grapple attachment from the ground while laying pipe end-to-end on the ground.

Figure 22:
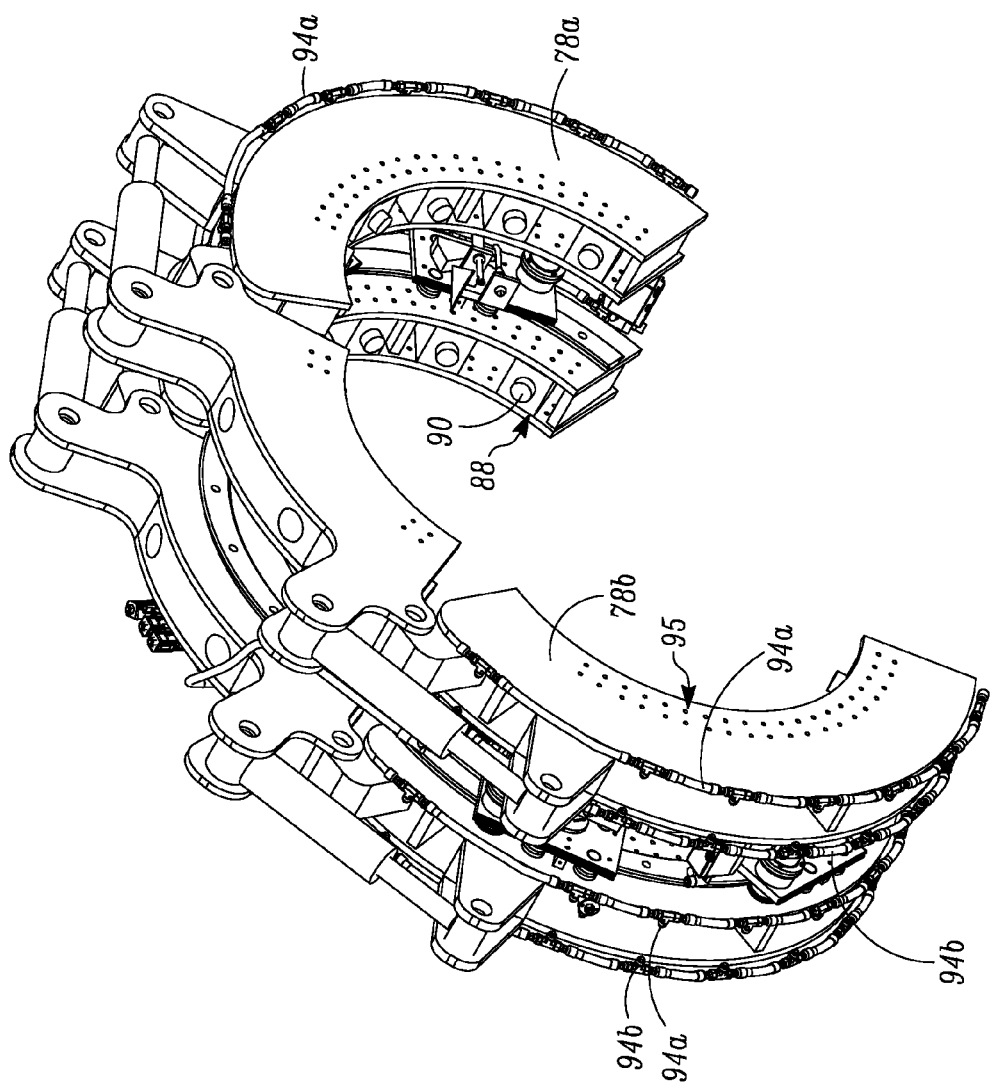

FIG. 22 is a perspective view of an embodiment of a pipe processing tool with hydraulic pressure and tank lines and adjustable pipe deformation members.

FIG. 23 is a side view of the pipe processing tool of FIG. 22.

DETAILED DESCRIPTION

Figure 1:
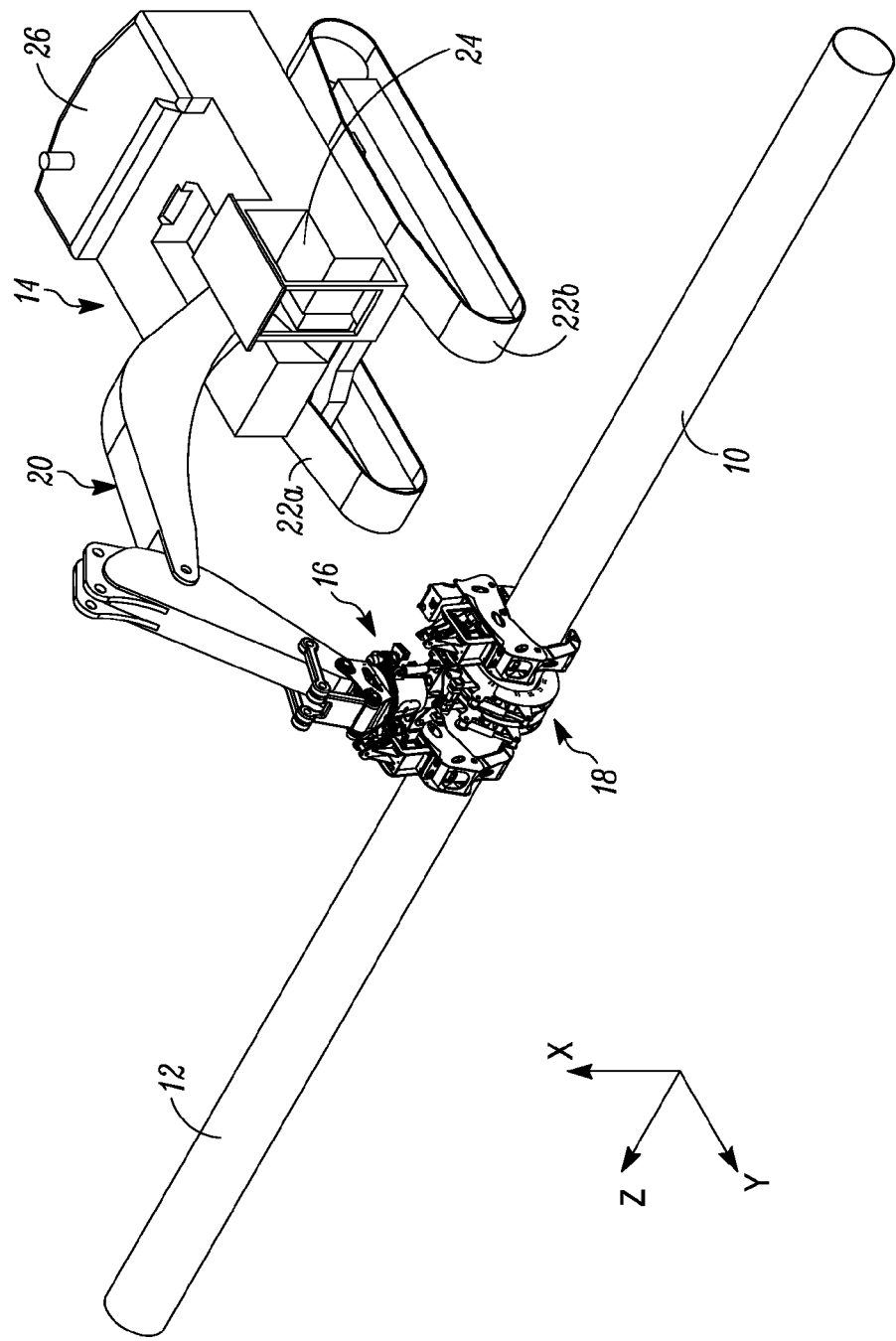
FIG. 1 illustrates an exemplary pipe processing tool used in conjunction with a grapple attachment mounted on construction equipment.

FIG. 1 illustrates equipment for performing pipe laying and attachment process where an end of a first pipe 10 is aligned with an end of a second pipe 12 for welding the ends of the pipes to one another. Although a pipe welding process is specifically mentioned, as discussed further below, the equipment is not limited to performing pipe welding. The equipment can be used to perform other processing operations on the pipe ends either separately from or in addition to welding.

The equipment includes construction equipment 14 such as an excavator, a grapple attachment 16 mounted to the construction equipment 14, and a pipe processing tool 18. The construction equipment 14 can be any type of construction equipment to which the grapple attachment 16 can be mounted. The construction equipment 14 is illustrated in FIG. 1 as being an excavator that includes a hydraulically controllable arm 20, left and right tracks 22a, 22b, an operator's cab 24 and an engine assembly 26. The excavator is of generally well known construction and as would be understood by a person of ordinary skill in the art, the tracks 22a, 22b are used to steer the excavator and move the excavator from position to position. In addition, the upper portion of the excavator including the cab 24 and the engine assembly 26 are rotatable about a vertical axis relative to the tracks 22a, 22b. However, the construction equipment is not limited to being an excavator and other types of construction equipment can be used.

The various movements of the construction equipment 14, including the arm 20, rotation of the tracks 22a, 22b, and rotation of the cab 24, can be controlled in conventional manner, for example using hydraulics and hydraulic actuators.

The grapple attachment 16 is mounted to the arm 20 of the excavator. With reference to FIGS. 1-3, the attachment 16 includes a main beam 30 that is pivotally connected to the base of a lower head assembly 32 by a pivot 34 for pivoting about a y-axis. The lower head assembly 32 is rotatably connected to a mount bracket 36 to permit the lower head assembly 32 to rotate or swivel 360 degrees relative to the mount bracket about a vertical x-axis. The mount bracket 36 detachably mounts the attachment 16 to the arm 20 of the construction equipment. Tilt actuators 38, 40 extend between the lower head assembly 32 and the main beam 30 to selectively tilt the main beam about the pivot 34 (i.e. about the y-axis). Further information on the construction and operation of a main beam, lower head assembly, mount bracket and the tilt actuators can be found in U.S. Pat. Nos. 8,146,971 and 8,567,836, which are incorporated herein by reference in their entireties.

The grapple attachment 16 includes a pair of grapple mechanisms 42, 44 mounted on the main beam 30. With reference to FIG. 3, the grapple mechanisms 42, 44 are mounted on the main beam so that each grapple mechanism is individually adjustable relative to the main beam 30 along the length of the main beam in a z-axis direction as shown by the arrows A in FIG. 3. Adjustment of each grapple mechanism 42, 44 is achieved by shift cylinders (not visible) which are disposed within the main beam, and each of which is fixed at one end to the main beam and fixed at an opposite end to the grapple mechanisms 42, 44. If desired, the shift cylinders can be located outside of the main beam. Further information on shifting grapple mechanisms on a main beam in a z-axis direction is described in U.S. Pat. No. 8,567,836.

In addition, the grapple mechanisms 42, 44 are shiftable forward and backward in the y-axis direction shown by the arrows B in FIG. 2, and up and down in the x-axis direction as shown by the arrows C in FIG. 3, to shift the positions of the pipe ends in the y-axis and x-axis directions. Further information on shifting grapple mechanisms in y-axis and x-axis directions is disclosed in U.S. patent application Ser. No. 13/951,938, filed on Jul. 26, 2013 and titled GRAB ARM HOUSING FOR GRAPPLE ATTACHMENT, the entire contents of which are incorporated herein by reference.

The z-axis direction is considered generally parallel to the ground, or parallel to the main beam, or parallel to the pipes, or left and right when viewing FIG. 3. The x-axis direction is an up and down vertical direction generally perpendicular to the z-axis direction and perpendicular to the main beam 30 when viewing FIG. 3. The y-axis direction is a forward and rearward direction generally perpendicular to the z-axis direction and to the x-axis direction, and perpendicular to the main beam 30 when viewing FIG. 3, and into and out of the page when viewing FIG. 3.

The grapple mechanism 42, 44 can be identical in construction, but can also be different in construction from each other. Each grapple mechanism includes a grab arm housing 46 and grab arms 48 connected to the grab arm housing. Operation of the grab arms 48 is controlled using one or more hydraulic cylinders on the grapple mechanisms 42, 44. In one embodiment, the grab arm housings are similar in construction and operation to the grab arm housings described in U.S. patent application Ser. No. 13/951,938, filed on Jul. 26, 2013 and titled GRAB ARM HOUSING FOR GRAPPLE ATTACHMENT.

As shown in FIGS. 1-3, each grapple mechanism 42, 44 is designed to pick up an end 50, 52 of the pipes 10, 12 using the grab arms 48 under the power of the construction equipment. The positions of the grab arm housings can then be adjusted in the x, y and/or z-axis directions as necessary to align the pipe ends 50, 52 during pipe attachment. In addition, the lower head assembly 32 can be rotated about the x-axis, the main beam 30 can be pivoted about the pivot 34 (i.e. about the y-axis), the arm 20 of the excavator can be adjusted, and the position of the excavator can be adjusted, in order to help achieve alignment of the pipe ends 50, 52. Any combinations of these adjustments can be utilized in order to achieve alignment of the pipe ends.

Once the pipe ends are aligned, the ends can then be welded or otherwise secured to each other, for example using the pipe processing tool 18. Prior to welding or after welding, other pipe processing operations can be performed on the pipe ends 50, 52 using the pipe processing tool 18 as discussed further below.

The attachment 16 can be used in the horizontal orientation illustrated in FIG. 1 with horizontal pipe and with the main beam 30 oriented generally parallel to the ground. The attachment 16 can also be used in a vertical orientation (not illustrated) with vertical pipes, with the main beam 30 oriented generally perpendicular to the ground. The attachment 16 can also be used with pipes that are oriented at angles between horizontal and vertical.

The pipe processing tool 18 is configured to clamp onto at least one of the pipe ends 50, 52 and help hold the alignment between the pipe ends. The pipe processing tool is also configured to perform one or more processing operations on the ends 50, 52 of the pipes. Examples of processing operations include, but are not limited to, welding the pipe ends 50, 52 together, coating one or more of the pipe ends, painting the pipe ends, cutting one or more of the pipe ends, applying a seal to seal the pipe ends, beveling one or more of the pipe ends, or sand blasting one or more of the pipe ends. Other processing operations are possible. Depending upon the processing operation, the processing operation can be performed before or after the pipe ends are aligned with each other.

In the illustrated embodiment, the pipe processing tool 18 is mounted on the grapple attachment 16 between the grapple mechanisms 42, 44. However, in another embodiment, the pipe processing tool 18 is not mounted on the grapple attachment 16 but can instead be separate from and perhaps used in conjunction with the grapple attachment 16.

Figure 2A:
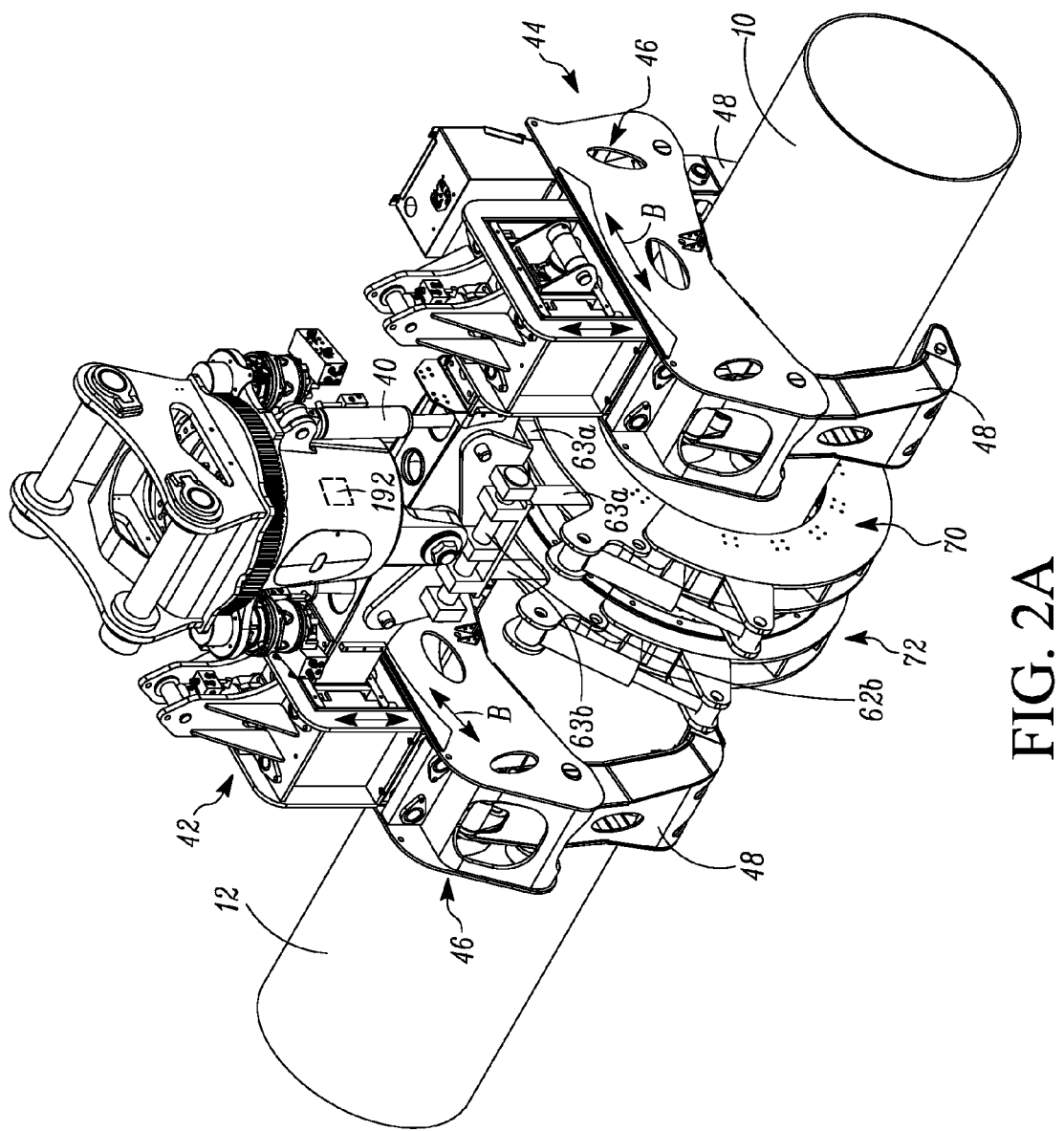
FIG. 2A is a close-up perspective view of the pipe processing tool and the grapple attachment with the pipe processing tool in a closed configuration.
Figure 2B:
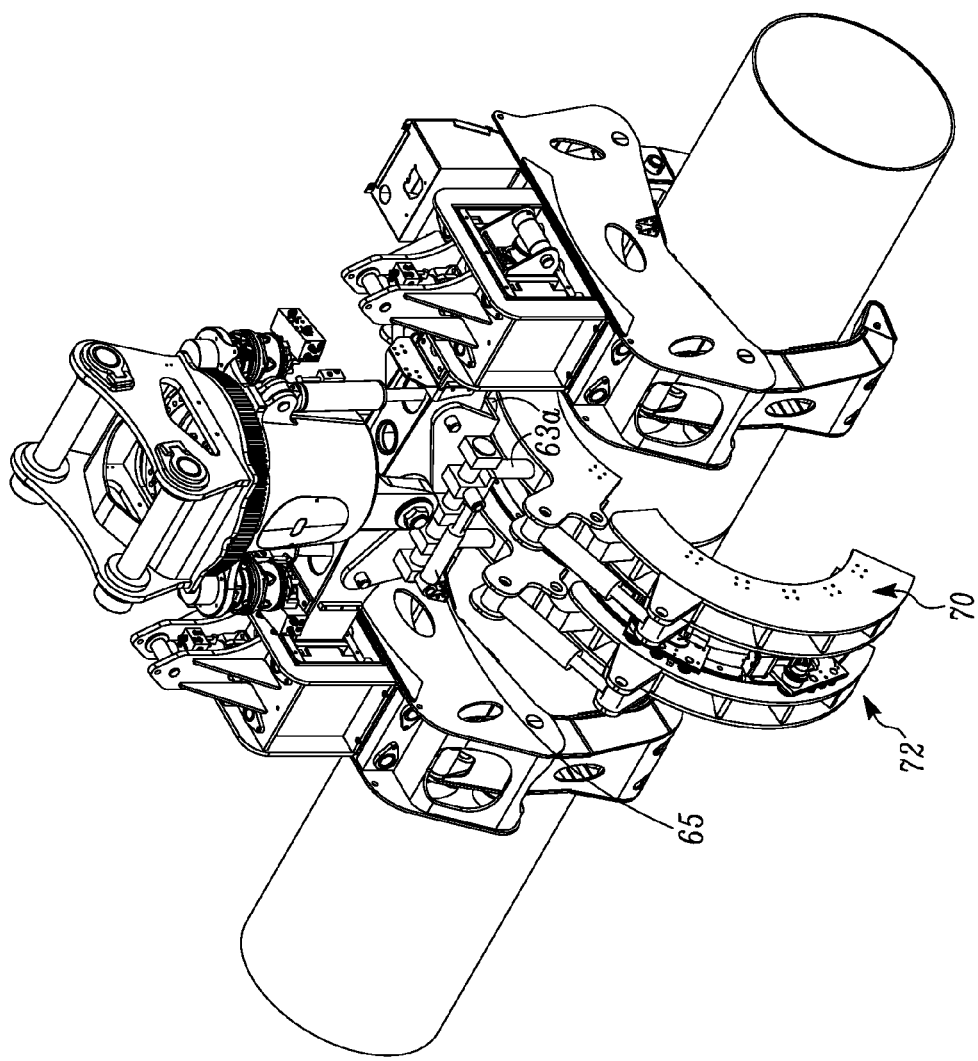
FIG. 2B is a view similar to FIG. 2A, but with the pipe processing tool in an open configuration
Figure 3:
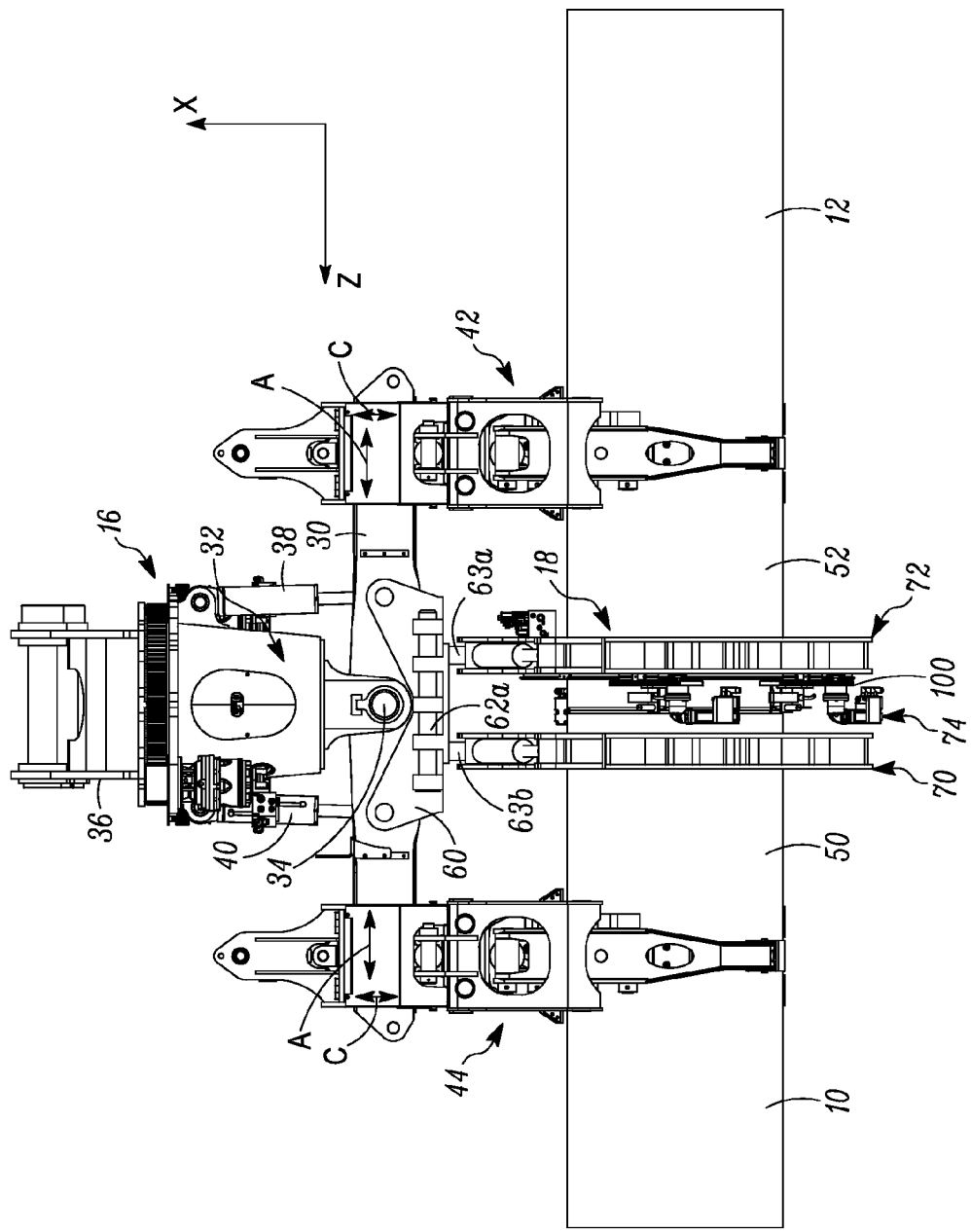
FIG. 3 is a side view of the pipe processing tool and the grapple attachment.

With reference to FIGS. 2A, 2B and 3, the pipe processing tool 18 is mounted on a bracket 60 that is attached to the main beam 30. The bracket includes first and second support rods 62a, 62b on opposite sides of the main beam 30. The support rods 62, 62b permit side to side adjustment of the position of the pipe processing tool 18 in the z-axis direction. Adjustment of the pipe processing tool 18 in the z-axis direction can be performed using one or more actuators 65 (visible in FIG. 2B). FIG. 3 shows the pipe processing tool 18 in a centered position on the rods 62a, 62b. FIG. 16 illustrates the pipe processing tool 18 shifted on the support rods 62a, 62b in the z-axis direction to an extreme left position. FIG. 17 illustrates the pipe processing tool 18 shifted on the support rods in the z-axis direction to an extreme right position.

FIGS. 2A, 2B, 3 and 12 also illustrate actuators 63a, 63b that are fixed at one end to the bracket 60 and at their opposite ends to the tool 18 for adjusting the tool vertically up and down in the x-axis direction. In the illustrated example, there are two of the actuators 63a and two of the actuators 63b. However, a single one of each of the actuators 63a, 63b could be used. FIG. 3 shows the pipe processing tool in a vertically center position. FIG. 18 shows the pipe processing tool shifted vertically upward in the x-axis direction by the actuators 63a, 63b to an uppermost position (the deformation ring 70 is removed for clarity). FIG. 2A shows the tool shifted vertically downward for engagement with the pipe ends.

The side-to-side shifting and up and down shifting of the tool 18 permits the position of the tool 18 to be precisely adjusted relative to the pipe ends 50, 52.

As shown in FIGS. 2A, 2B and 3, the pipe processing tool 18 includes first and second deformation rings 70, 72 that are configured to clamp onto the pipes 10, 12 adjacent to the ends 50, 52 thereof on either side of the joint between the ends. In an alternative embodiment illustrated in FIGS. 7 and 15, the pipe processing tool 18 includes a single one of the deformation rings 70 or 72 that is configured to clamp onto only one of the pipe ends, for example the end 52 illustrated in FIGS. 7 and 15.

The construction of each of the deformation rings 70, 72 are substantially similar to one another, except that either or both of the deformation rings includes at least one pipe processing mechanism 74 (discussed further below) mounted thereon for performing a particular processing operation. Therefore, only one of the deformation rings 70, 72 will be described in detail, it being understood that the other deformation can be substantially identical in construction with or without the pipe processing mechanism. In one embodiment, each of the deformation rings includes at least one pipe processing mechanism. In another embodiment, the pipe processing mechanism(s) on the deformation ring 70 can be configured to perform the same or similar processing operation as the pipe processing mechanism(s) on the deformation ring 72, or the pipe processing mechanism(s) on the deformation ring 70 can be configured to perform a different processing operation than the pipe processing mechanism(s) on the deformation ring 72.

Figure 4:
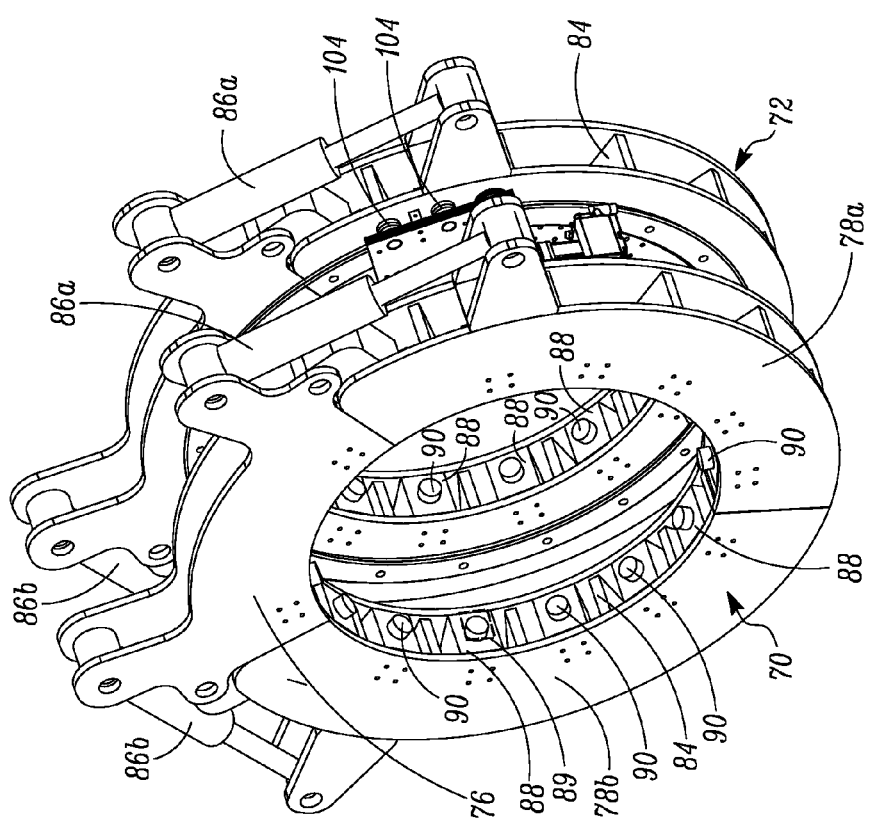
FIG. 4 is a detailed perspective view of the pipe processing tool.
Figure 5:
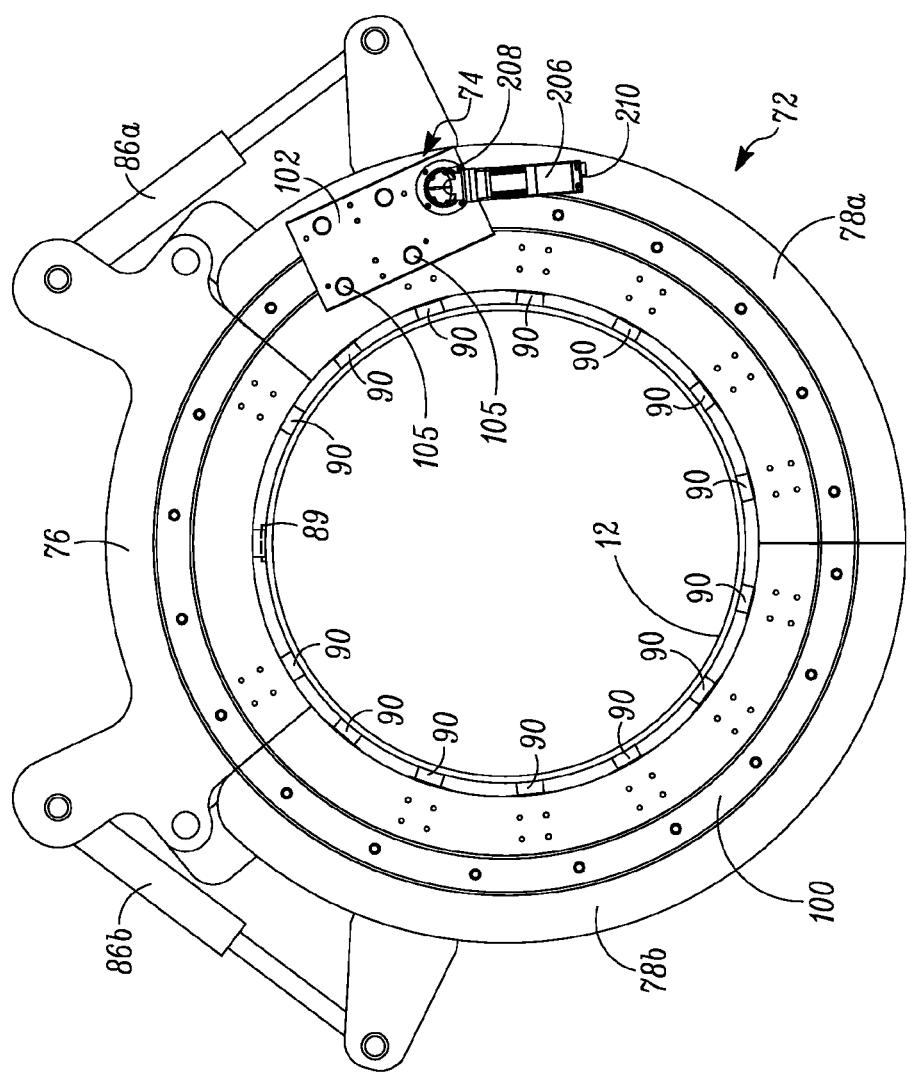
FIG. 5 is an end view of one deformation ring of the pipe processing tool.
Figure 6:
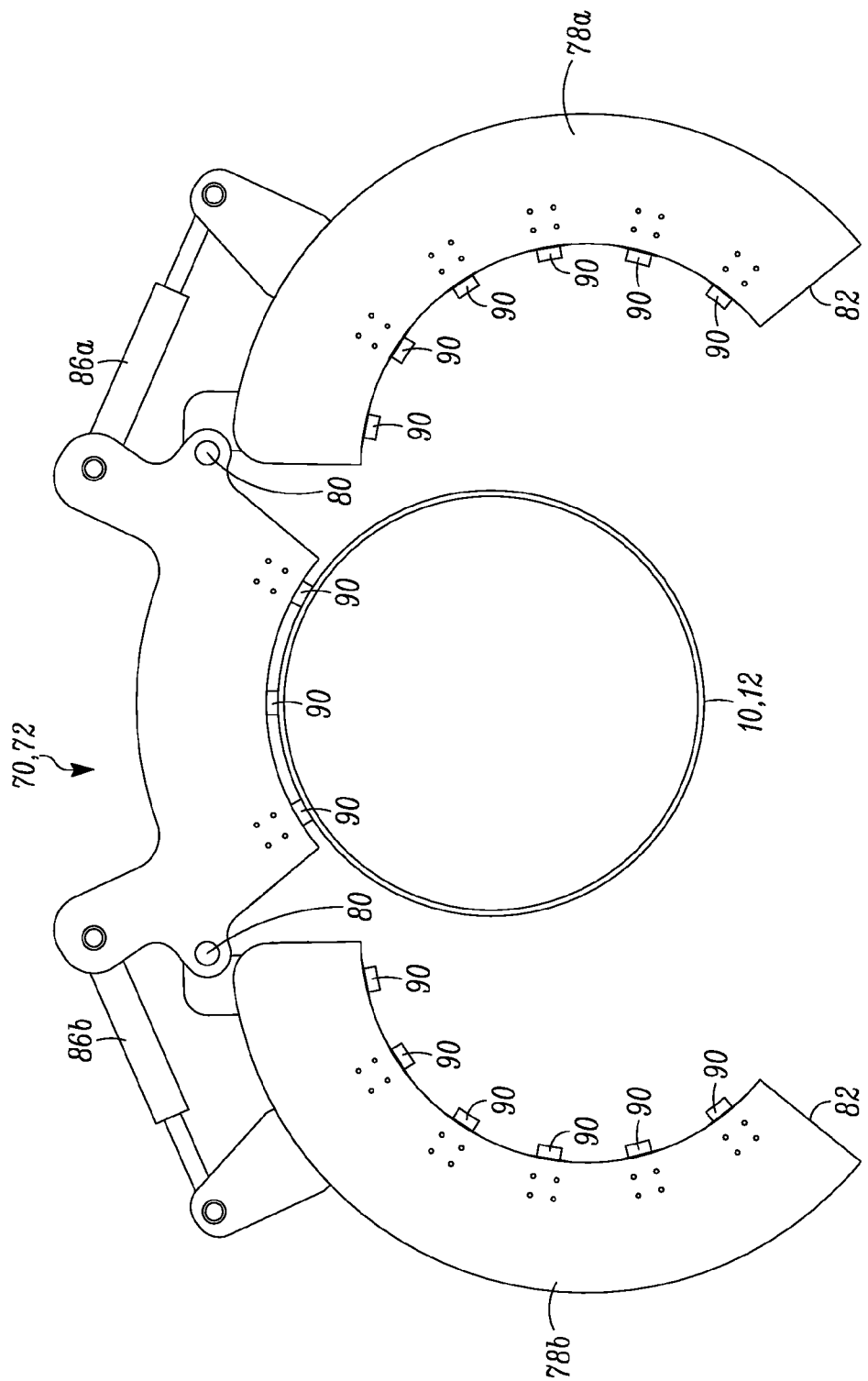
FIG. 6 is an end view of one of the deformation rings of the pipe processing tool in the open configuration.

Details of the deformation rings 70, 72 will be described with respect to FIGS. 4-6, where FIG. 4 illustrates each deformation ring 70, 72 in a closed configuration, FIG. 5 illustrates the deformation ring 72 which includes a single pipe processing mechanism 74, and FIG. 6 illustrates the deformation ring 70, 72 in an open configuration.

Each deformation ring 70, 72 is configured generally as a clamshell construction having a central support member 76 and a pair of clamshell members 78a, 78b that are pivotally attached by pivots 80 to the central support member 76 as best seen in FIG. 6. Thus each deformation ring 70, 72 has a closed configuration shown in FIGS. 4 and 5 and an open configuration shown in FIG. 6. In the closed configuration, the central support member 76 and the clamshell members 78a, 78b form a circle that can encircle the pipes 10, 12, and in the open configuration the deformation rings can be installed around or removed from the pipes. The free ends 82 of the clamshell members 78a, 78b can be provided with a releasable locking mechanism (not illustrated) that can be used to lock the ends 82 together when in the closed configuration to help retain the deformation rings clamped onto the pipes. An example of a releasable locking mechanism is disclosed in U.S. Pat. No. 8,328,071 the entire contents of which are incorporated herein by reference in their entirety.

In the illustrated example, the central support member 76 is formed by a pair of plates that are spaced from one another using suitable spacers that can have any configuration, for example round or flat. Likewise, each of the clamshell members 78a, 78b is formed by a pair of plates that are spaced from one another using spacers 84 that are visible in FIG. 4. Linear actuators 86a, 86b, such as hydraulic cylinders or other suitable actuators, are connected between the central support member 76 and each of the clamshell members 78a, 78b for pivoting the clamshell members between the open and closed positions.

Each deformation ring 70, 72 further includes a plurality of interchangeable pipe deformation members 88 disposed on, and circumferentially spaced from one another about, an inner circumference thereof. The pipe deformation members 88 are disposed on the central support member 76 and on each of the clamshell members 78a, 78b. Each of the pipe deformation members 88 faces radially inward toward a center of the deformation ring when the deformation ring is in the closed configuration. In one embodiment, the pipe deformation members are equally spaced from one another about the inner circumference of the deformation ring. However, the deformation members 88 can have any spacing from one another as long as they can deform the shape of the pipe.

The pipe deformation members 88 are designed to engage outer surfaces of the pipe 10, 12 and apply forces to the pipes to deform the circumferential shapes of the pipes in order to change the circularity of the pipes prior to welding so that the shapes of the pipe ends more closely match one another. Preferably, the pipe deformation members 88 are designed to operate automatically (i.e. non-manually) under control by a suitable controller. So any type of pipe deformation members 88, including hydraulically actuated, electrically actuated, pneumatically actuated, or the like, that can be automatically operated and controlled can be used.

In the illustrated embodiment, each of the pipe deformation members 88 comprises a fluid actuated piston 90 that is hydraulically actuatable in a radial direction toward and away from the center of the deformation ring in order to permit engagement with the pipe and change the force applied to the pipe. In one embodiment, an optional force distribution member 89 (illustrated in dashed lines in FIGS. 4 and 5) can be secured to the pipe engaging end of each of the pistons 90 to help distribute the pressure applied by each of the pistons 90. The force distribution members 89 can be removably attached to the pistons 90 permitting the members 89 to be removed and replaced with different members 89. The members 89 can have different shapes and sizes depending upon factors such as the circumferential shape of the pipe end, how much force needs to be applied, the shape one is trying to deform the pipe to, and the like. In addition, a member 89 can be shared between two or more of the pistons 90.

With reference to FIG. 19, each of the pipe deformation members 88 includes two hydraulic fittings 91a, 91b. The fitting 91a is connected to supply pressure and fluidly communicates with one side of the piston 90. The fitting 91b is connected to the hydraulic tank and acts as a drain for hydraulic fluid from the supply side of the piston. A valve 92, controlled by a control module discussed below, controls the flow of hydraulic fluid either into the fitting 91a or from the fitting 91b. Any type of valve 92, directional or bidirectional, can be used.

In addition, a pressure reducing valve 93 can be provided to reduce, for example automatically, the pressure of the hydraulic fluid which was increased by a hydraulic intensifier in a hydraulic manifold 158 (FIG. 14). The valve 93 can allow some of the deformation members 88 to automatically retract if needed to match the pipe contour. The intensifier in the manifold increases the pressure of the hydraulic fluid from the excavator if the pressure is too low.

The actuators 86a, 86b, the hydraulics for the members 88, and the hydraulics for controlling the actuators that produce the side-to-side and up/down shifting of the tool 18, are hydraulically connected to the manifold 158 (seen in FIG. 14) disposed on the side of one of the deformation rings. The manifold 158 is controlled via a control module 194.

In order to permit alteration of the circularity of the pipe, each of the pipe deformation members 88 can be individually and separately actuatable from the other pipe deformation members. This permits the individual force applied by each of the pipe deformation members 88 to the pipe to be controlled. So by controlling the forces applied by the members 88 around the circumference of the pipe, the circularity of the pipe can be changed.

With reference to FIGS. 22 and 23, in an embodiment, a pressure line 94a and a tank line 94b extend around each clamshell member 78a, 78b. Each pressure line 94a is connected at one end to the manifold 158 to receive hydraulic fluid. In addition, each tank line 94b is connected at one end to the manifold 158 to direct fluid to the tank. In addition, the fittings 91a, 91b of each deformation member 88 are connected to the pressure and tank lines 94a, 94b, respectively, via suitable hoses.

With continued reference to FIGS. 22 and 23, in an embodiment, the circumferential positions of some or all of the pipe deformation members 88 on the clamshell members 78a, 78b can be adjusted as represented by the arrows in FIG. 23. The members 88 can be moved to different positions depending upon factors such as the amount and location of the deformation of the pipe(s) that is needed. The movement of the members 88 can be performed manually or automatically.

In the example illustrated in FIGS. 22, 23, the circumferential positions of the members 88 are adjustable manually. For example, the clamshell members 78a, 78b are illustrated as including a plurality of mounting holes 95 extending along each plate of each clamshell member 78a, 78b. Each member 88 is fixed in position by suitable removable fastening members, such as pins or screws, that extend through the mounting holes 95. However, by removing the fastening members, the circumferential position of the member 88 can be adjusted with the member then being fixed in its new position by reinstalling the fastening members.

The circumferential positions of the members 88 can also be automatically adjusted based on feedback from the sensors regarding the circumferential shape(s) of the pipe end(s) discussed below. By adjusting the positions of the members, the members 88 can be positioned at locations that are suitable for achieving the desired circumferential shape(s) of the pipe end(s).

At least one of the deformation rings 70, 72, for example the deformation ring 72, includes a 360 degree track 100 disposed thereon as best illustrated in FIGS. 3 and 5. The track 100 can be disposed on either side of the central support member 76 and the clamshell members 78a, 78b, but in the illustrated example is mounted on the side facing the other deformation ring. In the illustrated example, the track 100 comprises a raised bar that is spaced from the side surface of the deformation ring on which it is disposed, and which is configured to movably support the pipe processing mechanism in a manner to permit the pipe processing mechanism to move 360 degrees along the track 100.

Figure 5A:
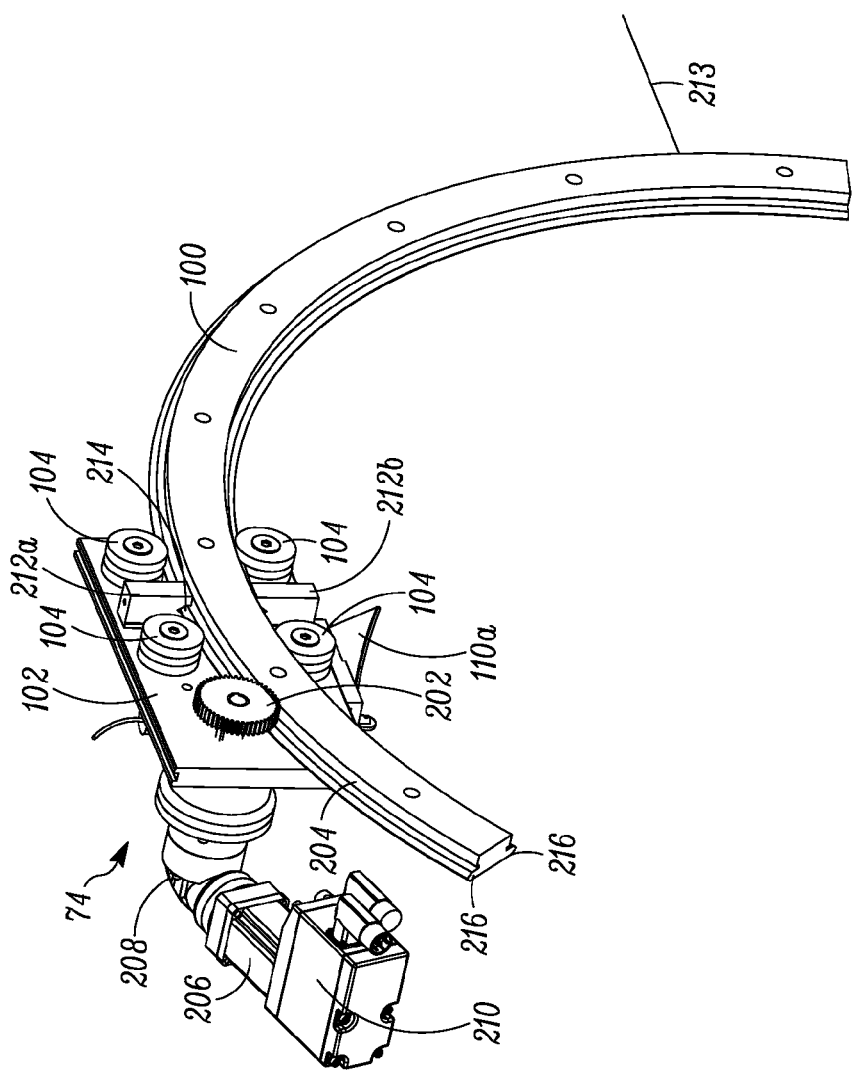
FIG. 5A is a view of the backside of the carrier that carries the processing mechanism.

The pipe processing mechanism can be any structure(s) that can move along the track 100 and which can be configured to perform at least one processing operation on one or both ends 50, 52 of the pipes 10, 12. As best seen in FIGS. 4, 5, and 5A, the pipe processing mechanism can include a carrier 102 having a plurality of rollers 104 mounted on the backside thereof facing the deformation ring on which it is disposed. The rollers 104 movably support the carrier 102 on the track 100 allowing the carrier 102 to move along the track. In addition, upper and lower guides 212a, 212b help to retain the carrier 102 on the track 100. Each guide 212a, 212b includes an end that faces the track 100, with each end including a notch 214 that receives a correspondingly shaped ridge 216 formed on the track 100. In another embodiment, the rollers 104 can form a sufficient guide in which case the guides 212a, 212b may not be used.

The backside of the carrier 102 also includes a drive gear 202 that engages with a 360 degree toothed track 204 formed on the track 100. See FIG. 5A. For sake of simplicity, the teeth on the track 204 are not illustrated in FIG. 5A. In another embodiment, instead of using a drive gear 202 and a toothed track, a friction drive wheel could be used in place of the drive gear 202 that is in frictional driving engagement with a surface of the track 100 for causing movements of the carrier 102. Any form of drive mechanism that is suitable for causing movement of the carrier could be used.

In the case of the drive gear 202, the drive gear is rotated in either direction by a reversible, variable speed drive motor 206 through a suitable drive train including a gear box 208. A motor controller 210 controls the direction of rotation and the speed of the motor and thus of the carrier 102. Electricity for the motor 206, the controller 210, and any other electronic components on each pipe processing mechanism 74 is provided via a wiring harness 211 back to the control module 194. FIG. 20 shows the wiring harness 211 to one of the pipe processing mechanisms 74, it being understood that separate wiring harnesses can be provided to each pipe processing mechanism 74.

With reference to FIG. 5A, instead of using a wiring harness to each mechanism 74, power for each mechanism 74 can be provided by a wire 213 connected to the track 100 which directs electricity to the track. Power can then be transferred to the mechanism(s) 74 via an electrical pick-up on the carrier 102 in manner similar to a slip ring construction.

As seen in FIG. 5, the carrier 102 is provided with a plurality of mounting holes 105 that permits removable mounting of various sensors and pipe processing tools 106 (shown in FIG. 13), discussed further below, to the carrier 102.

The pipe processing tool(s) 106 mounted to the carrier determines the processing operation that is performed. The pipe processing tool(s) can be configured to perform processing operations that can include, but are not limited to, welding, coating, cutting, sealing, beveling or sand blasting. In the illustrated example, the pipe processing tool 106 is configured to perform welding and includes a welder mounted on the carrier 102 for welding the ends 50, 54 of the pipes 10, 12 to one another. Further details of the welder and carrier 102 are discussed below with respect to FIGS. 12-13.

The mechanism 74 can be configured to perform a single processing operation or multiple processing operations. If the mechanism 74 is configured to perform a single processing operation, a single processing tool 106 can be removably mounted on the carrier 102. The pipe processing tool and can be removed and replaced with a different pipe processing tool to change the processing operation. Alternatively, multiple pipe processing tools 106 can be mounted on the carrier 102.

FIG. 5 illustrates a single one of the pipe processing mechanisms 74. In this embodiment, the mechanism 74 is intended to rotate 360 degrees around the track 100 to process around the entire circumference of the pipe.

In an alternative embodiment shown in FIGS. 12 and 13, a plurality of the pipe processing mechanisms 74, in the illustrated example four identical mechanisms 74, can be disposed on the ring 100, with each mechanism intended to perform its processing operation over the entire 360 degree circumference of the pipe or about a limited portion of the pipe, for example about a 90 degree extent of the pipe(s). As shown in FIG. 13, each of the processing mechanisms 74 includes at least one of the processing tools 106, in this case a welder. Any type of welder performing any type of welding can be used. In one example, the welder can be a wire feed welder.

In the case of an attachment operation where the end 50 of the pipe 10 is to be welded to the end 52 of the pipe 12, the shapes of the ends 50, 52 of the pipes 10, 12 should match as closely as possible. Most often, the pipes 10, 12 have a circular cross-sectional shaped flow passage. However, prior to welding, the shapes of one or both ends 50, 52 may deviate from circular. Therefore, one or both of the deformation rings 70, 72 can be used to deform the shape of its respective pipe end 50, 52 so that the cross-sectional shapes can match.

One or more sensors can be used to detect the shape of at least one of the pipe ends. In another embodiment, sensors can detect the shape of each of the pipe ends. In the case of circular pipe, the sensor(s) detect the shapes (or the circularity, i.e. how close to, or how far each end is from, a perfect circle) of the ends 50, 52 of the circular pipe. The data from the sensors is fed to a control system which in turn uses the data to control the pipe deformation members 88 to deform the circumferential shape of one or both of the pipe ends until the circumferential shapes of the pipe ends generally match one another. As explained above, it is not required that the circumferential shapes of the pipe ends be a perfect or near perfect circle. The circumferential shapes can be any shape as long as they match one another closely enough to permit the attachment operation to be performed.

The sensors can be non-contact type sensors or contact-type sensors. Non-contact type sensors include, but are not necessarily limited to, one or more lasers. Examples of contact type sensors include, but are not necessarily limited to, Linear Variable Differential Transformers (LVDT) or Rotary Variable Differential Transformers (RVDT).

As best seen in FIGS. 12 and 13, each of the mechanisms 74 includes a laser 110 mounted on, for example, the carrier 102. The lasers 110 do not need to be mounted to the carrier 102. Instead, the lasers 110 can be mounted at any location suitable for performing their described functions. For example, the lasers 110 could be mounted to the central support member 76 and/or to the clamshell members 78*a*, 78*b* and/or to the main beam 30.

Each laser 110 can be a line laser that directs a line of light 110*a* at the pipe and senses the return light to capture a portion of the 3-dimensional curvature of the pipe ends. By rotating the carriers 102 around the pipe, the data from the lasers 110 can be combined to detect the entire 3-dimensional curvature (i.e. the circumferential shape) of each pipe end. In embodiments where only a single mechanism 74 is used, only a single one of the lasers 110 can be used as long as the carrier 102 can rotate the entire 360 degrees around the pipe.

In another embodiment, a single laser can be used to determine the 3-dimensional curvature of only one of the pipe ends. This may be useful where the 3-dimensional curvature of one of the pipe ends has already been determined or where it is assumed that the 3-dimensional curvature of one of the pipe ends is of a certain shape.

The data from the laser 110 is fed to a controller which uses the data to determine the circumferential shape of one or both of the pipe ends. The controller then controls the pipe deformation members 88 of one or both of the deformation rings 70, 72 to suitably deform one or both of the pipe ends 50, 52. The operation of the lasers 110 and the deformation by the pipe deformation members 88 can continue until such time as the controller determines that the shapes of the pipe ends match one another and are suitable for welding together.

In addition, it is preferred that a means be provided to determine the distance of the carrier from the pipe end. The distance from the pipe end is used to adjust the welder during welding to achieve optimal welding. In one embodiment, the distance from the pipe can be measured using a linear transducer 111 that is mounted on each carrier 102 as shown in FIG. 13. Alternatively, the lasers 110 could be used to determine the distance from the pipe ends.

If pipe processing operations other than or in addition to welding are to be performed, those separate pipe processing operations can be performed by the pipe processing tool 18 before or after the welding operation of the pipe ends 50, 52. The lasers 110 and/or the linear transducer 111 may or may not be used with processing operations other than welding.

Figure 7:
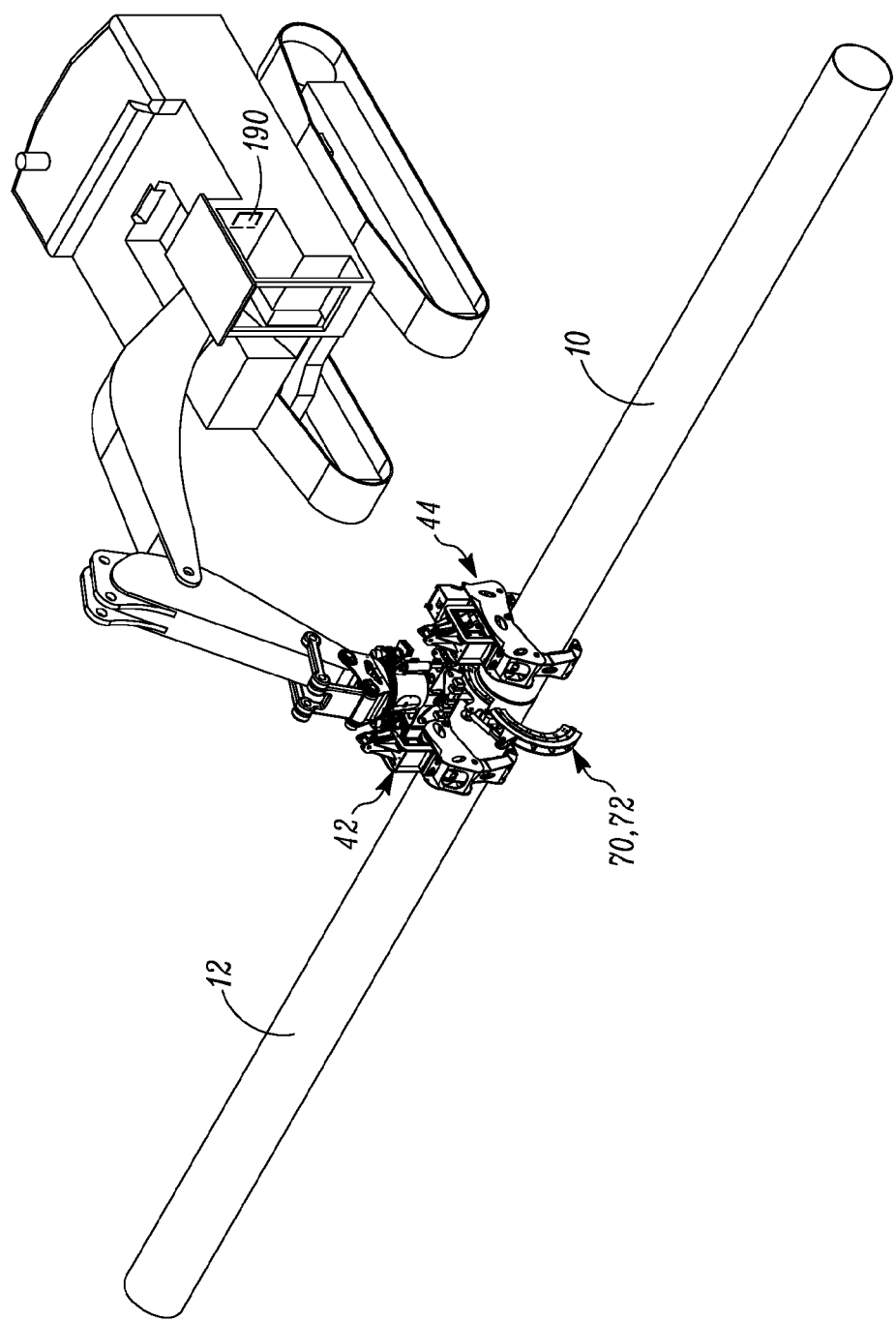
FIG. 7 illustrates an alternative embodiment of a pipe processing tool that uses a single deformation ring.

In operation, with reference to FIGS. 1, 3 and 7, the grapple attachment 16 is used to pick up the ends of the two pipes to be joined together. Through suitable movements of the grapple attachment 16 (for example, tilting of the main beam 30; rotation of the lower head assembly 32; shifting of the grapple mechanisms 42, 44 in the x, y, and/or z axis directions) and optionally together with movements of the excavator 14 (for example, forward/backward via the tracks 22*a*, 22*b*; rotation of the cab 24/engine assembly 26; and movements of the arm 20), the ends of the two pipes 10, 12 are brought together and aligned with one another. The alignment process can be facilitated using suitable sensors as described in U.S. Pat. No. 8,328,071.

Once alignment is achieved, the pipe processing tool 18 is engaged with one or more of the pipe ends 50, 52. In the case where both pipe deformation rings 70, 72 are used, each deformation ring is installed around its respective pipe end to help retain the pipe ends in their aligned position. The sensor(s) 110 may then be used to determine the circumferential shapes of the pipe ends 50, 52 in order to determine whether or not the circumferential shapes match closely enough. If the shapes do not match closely enough, select ones of the pipe deformation members 88 on at least one of the pipe deformation rings 70, 72 are actuated as determined by the controller in order to suitably deform the end(s) of the pipe(s) until the shapes more closely match one another. Once the shapes are determined to match one another, the ends 50, 52 can then be welded to one another.

All of the movements and operations of the grapple attachment 16, the excavator 14 and the pipe processing tool 18 can be controlled from the operator's cab 24 of the excavator, from an operator on the ground outside of the cab 24, or a combination thereof. In one embodiment shown in FIG. 21, all of the operations can be controllable from the ground by an operator via a portable control assembly 150 that can be carried by the operator or that can be suitably supported on the ground. Allowing an operator to control all operations is advantageous because it allows the operator to be closer to the intended joint between the two pipe ends 50, 52 permitting the operator to visually see the pipe ends and the alignment process thereof.

With reference to FIGS. 8-11, an example of the portable control assembly 150 is illustrated. The portable control assembly 150 is designed to allow an operator to control all of the functions of the excavator 14, the grapple attachment 16, and the pipe processing tool 18 that may be required to bring the ends of the two pipes together, align the ends, and perform processing operations on the pipe ends, such as welding the ends together. The control assembly 150 can have any configuration that permits this functionality. In the illustrated embodiment, the control assembly 150 includes a main control assembly 152 and a remote control pendent 154 that is supportable on and removable from the main control assembly 152.

Figure 8:
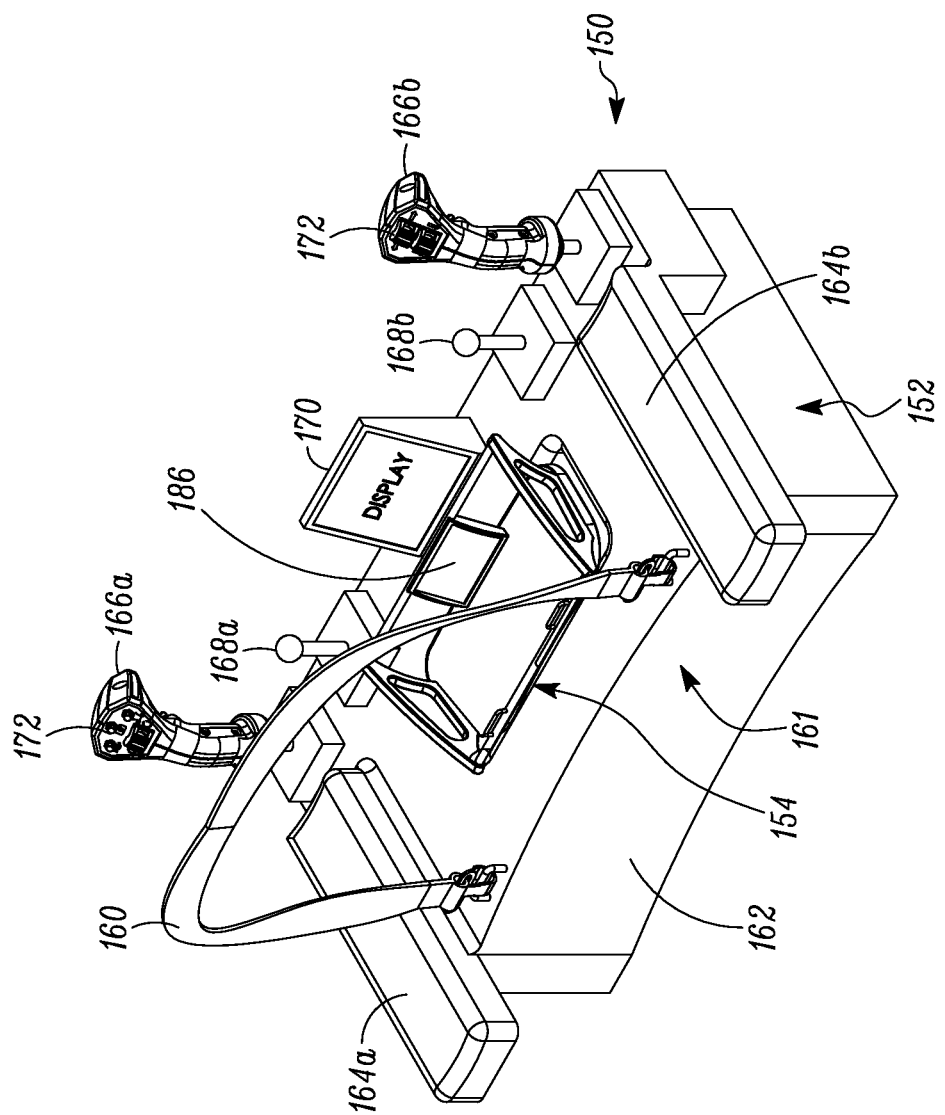
FIG. 8 illustrates an example of a portable control assembly that can be used to control the construction equipment, the grapple attachment and the pipe processing tool.

As best seen in FIG. 8, the main control assembly 152 is designed to be physically carried by an operator and includes a carrying strap 160 suitably fixed at each end to the main control assembly 152. The main control assembly 152 can be battery powered or it can be powered by a suitable power line running from the excavator 14 or other suitable source of power.

The assembly 152 includes a generally rectangular housing 161 with a front side 162 that can be curved to allow the main control assembly to generally conform to the belly or midriff area of the operator. Left and right forearm rest pads 164a, 164b are disposed on the top of the housing 161 and provide locations for the operator to rest his forearms on during use. A set of left and right combined joystick handgrip controls 166a, 166b are mounted on the housing 161 adjacent to the end of each rest pad 164a,b. Each control 166a, 166b includes a handgrip mounted on a joystick. In addition, a set of left and right joystick controls 168a, 168b are mounted on the housing 161 adjacent to the joystick handgrip controls 166a,b.

The joystick handgrip controls 166a,b and the joystick controls 168a,b can be designed to control various functions. For example, in one embodiment, the controls can be set-up to control the following functions:

1) The left joystick handgrip control 166a:
   excavator rotation and excavator stick cylinder can be controlled by movements of the joystick portion of the control 166a;
   rotation of lower head assembly 32 can be controlled by one or more buttons on the handgrip portion of the control 166a;
   the shift mode of the grapple mechanisms 42, 44 (i.e. controlling whether shifting is in x, y or z direction) can be controlled by one or more buttons on the handgrip portion of the control 166a;
   clamping of one of the grab arms of one of the grapple mechanisms can be controlled by one or more buttons on the handgrip portion of the control 166a.

2) The right joystick handgrip control 166b:
   excavator bucket cylinder and excavator boom cylinders can be controlled by movements of the joystick portion of the control 166b;
   tilting of the main beam 30 can be controlled by one or more buttons on the handgrip portion of the control 166b;

x, y and z-axis shifting of the grapple mechanisms 42, 44 can be controlled by one or more buttons on the handgrip portion of the control 166b;
   clamping of one of the grab arms of one of the grapple mechanisms can be controlled by one or more buttons on the handgrip portion of the control 166b.

3) Left joystick control 168a
   left excavator track

4) Right joystick control 168b
   right excavator track.

These particular functions controlled by each control 166a, 166b, 168a, 168b are exemplary only, and the controls can be assigned different functions. As shown in FIG. 8, the joystick handgrip controls 166a, 166b include various buttons 172 thereon that implement the different control functions of the pipe processing tool 18. In an alternative embodiment, the main control assembly 152 can also be set-up to control the pipe processing tool.

The main control assembly 152 can also include a display 170 that can display any data or information relating to the grapple attachment 16 and/or the excavator 14.

Figure 9:
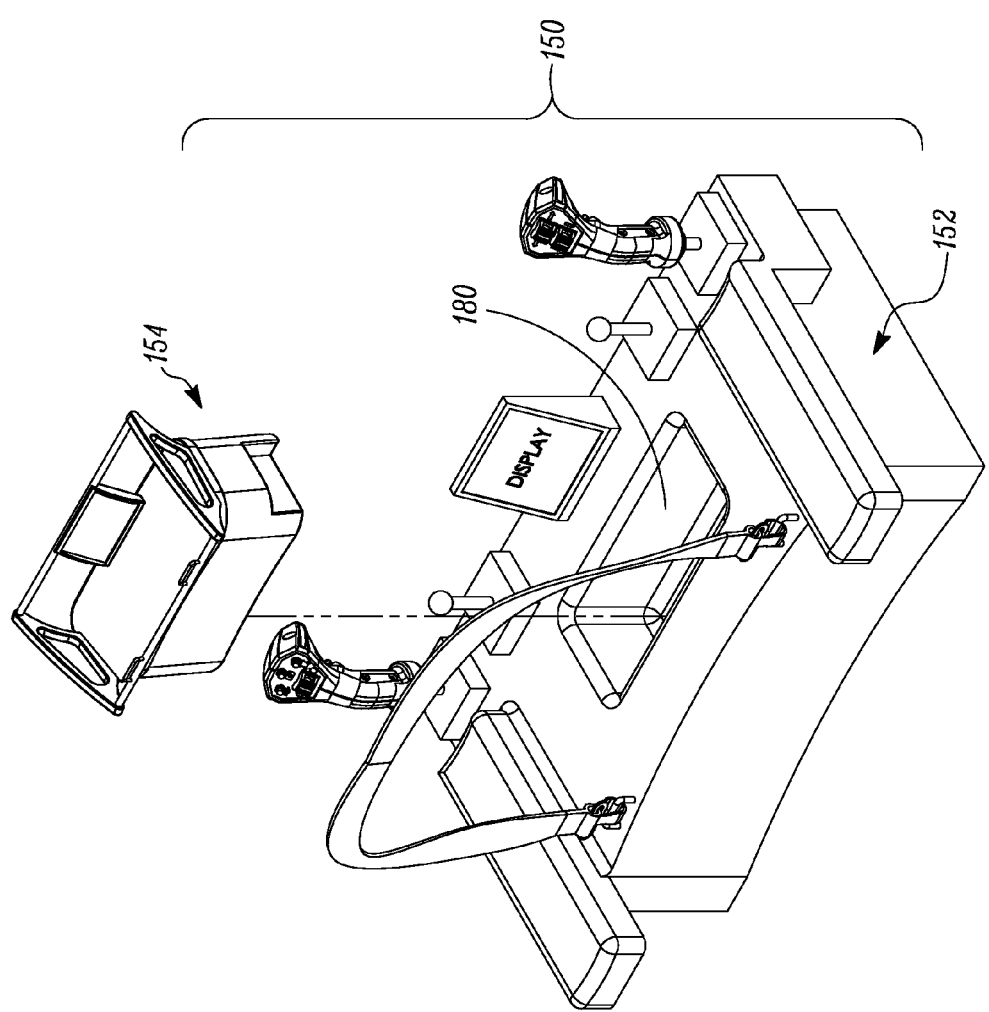
FIG. 9 illustrates the remote control pendent removed from the main control assembly.
Figure 10:
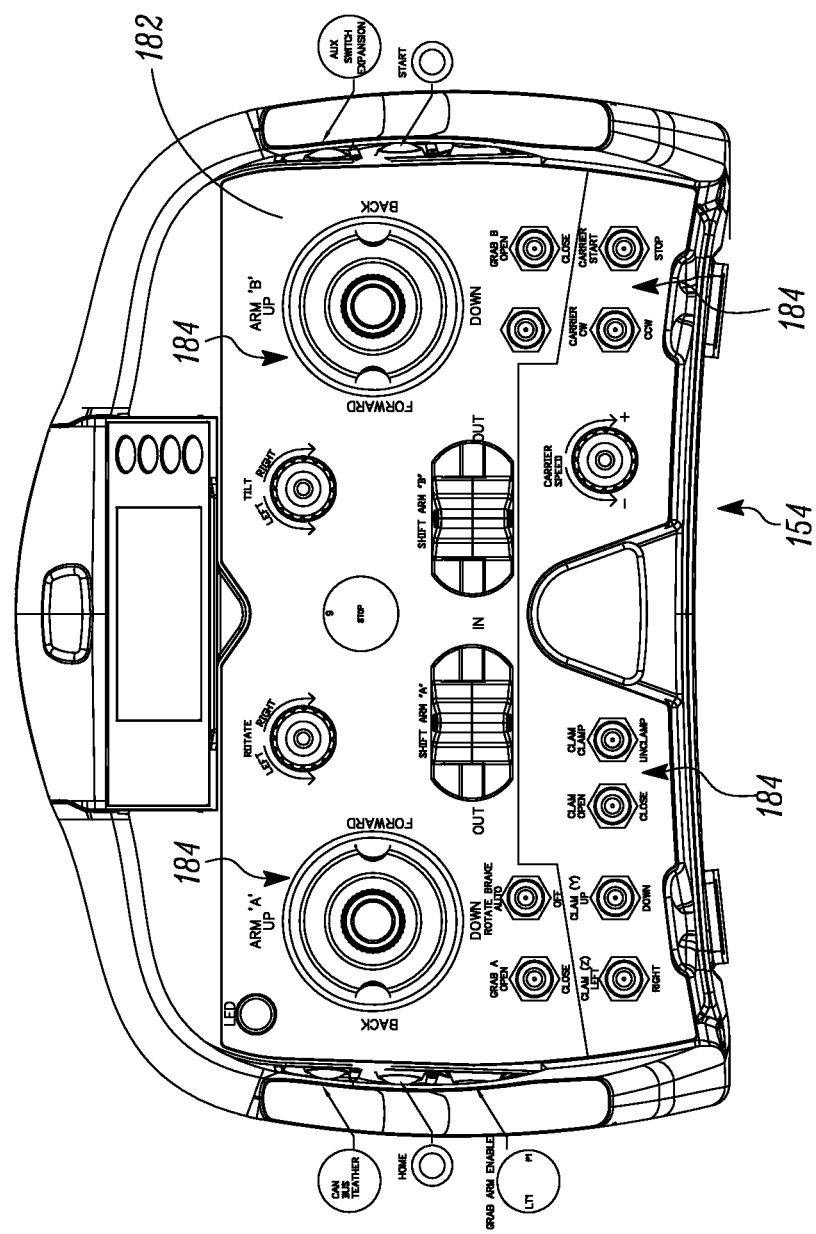
FIG. 10 illustrate the remote control pendent.

With reference to FIGS. 8-10, the remote control pendent 154 is designed to mate with the main control assembly 152 during use or it can be used physically separate from the main control assembly 152. As best seen in FIG. 9, the housing 161 of the main control assembly 152 includes a recess 180 formed therein in which the remote control pendent 154 can be removably disposed. As a result, the physical size of the remote control pendent 154 is less than the physical size of the main control assembly 150, rendering the pendent 154 more readily manually portable.

The remote control pendent 154 can be battery powered or it can be powered by a suitable power line running from the excavator 14 or other suitable source of power. In one embodiment, the battery or batteries of the remote control pendent 154 is recharged by the main control assembly 152 when the pendent 154 is inserted into the recess 180, such as via a mating power connection.

With reference to FIG. 10, the pendent 154 includes a housing 182 that is sized to be carried in the hands of an operator. If desired, the pendent 154 could also include a shoulder strap or other carrying aid to facilitate carrying by the operator. The top of the housing 182 includes a plurality of control buttons 184 that implement the various control functions of the pendent 154.

In the illustrated example, the pendent 154 is designed to control the various functions of the pipe processing tool 18 and the grapple attachment 16. In particular, the pendent 154 is designed to control the opening and closing of the clamshell members 78a, 78b of the pipe deformation rings, control operation of the pipe deformation members 88, control operation of the pipe processing mechanism 74, and control side to side and vertical shifting of the pipe processing tool. In addition, the pendent 154 is configured to control the various operations of the grapple attachment 16 as discussed above, such as tilting of the main beam, rotation of the lower head assembly 32, x, y and z axis movements of the grapple mechanisms 42, 44, and opening and closing of the grab arms 48. Optionally, the pendent 154 could also be configured to control the excavator 14.

The pendent 154 can also include a display 186 that can display any data or information relating to the pipe processing tool 18 and the grapple attachment 16, and optionally the excavator 14.

Although the main control assembly 152 and the pendent 154 are illustrated as being separable from each other, the functions thereof can be integrated into a single, inseparable unit if desired. In addition, although the pendent 154 is intended to be used while physically separate from the main control assembly 152, the pendent 154 can be operated while it is mated with the main control assembly as shown in FIG. 8.

Control signals, data signals and other communications between the various components can be implemented wirelessly using suitable wireless communication technology, for example radio communications such as Bluetooth or WiFi. For example, a control module 190 (see FIG. 7) on the excavator 14 can include a transceiver that sends signals to and receives signals from a transceiver on the main control assembly 152. The excavator control module 190 is integrated with the control system of the excavator to control the excavator based on signals from the main control assembly and to send desired data signals from the excavator to the main control assembly regarding the operation of the excavator.

A control module 192 (see FIG. 2) on the grapple attachment 16 includes a transceiver that sends signals to and receives signals from a transceiver on the main control assembly 152. The grapple attachment control module 192 controls the grapple attachment based on signals from the main control assembly and sends desired data signals from the grapple attachment to the main control assembly regarding the operation of the grapple attachment.

The control module 194 (see FIG. 14) on the pipe processing tool 18 or on the grapple attachment 16 includes a transceiver that sends signals to and receives signals from a transceiver on the pendent 154. The pipe processing tool control module 194 controls the pipe processing tool based on signals from the pendent and sends desired data signals from the pipe processing tool to the pendent regarding the operation of the pipe processing tool. The control module 194 is connected to and controls the laser(s) 110, the linear transducers 111, the actuation of the pipe deformation members 88, the side-to-side shifting of the pipe processing tool, and the up and down shifting of the pipe processing tool.

However, in some embodiments, the main control assembly 152 and the pendent 154 could be hard wired to the equipment 14, the attachment 16 and the pipe processing tool 18.

With reference to FIG. 11, a schematic depiction of an exemplary control scheme between various components of the system, including the portable control assembly 150, the construction equipment 14, the grapple attachment 16, and the pipe processing tool 18, is illustrated. In the illustrated embodiment, the control module 190 routes control signals between the handgrip controls 166*a, b*, the construction equipment 14 and the control module 192 on the grapple attachment 16. The control module 190 can also route signals to and from a cab monitor located in the cab of the construction equipment that can display information such as the status of various components, a live video feed of the equipment and/or the grapple attachment 16, and the like.

The control module 192 controls operation of the grapple attachment 16, and routes control signals to and from the grapple mechanisms 42, 44 and the pipe processing tool 18.

In addition, the main control assembly 152 and/or the remote control pendent 154 are in communication with the control module 192 for permitting control of the operation of the grapple attachment 16, the grapple mechanisms 42, 44 and the pipe processing tool 18. The portable control assembly 150 can also be used to control the excavator 14 and the attachment 16 to pick-up pipe, string pipe (i.e. lay pipe end-to-end in preparation to be welded together), set-up the pipe (i.e. after stringing the pipe, the pipe is welded together, typically above ground, using the pipe processing tool), and perform lower in operations (i.e. once the pipe is welded together, it is lowered into a trench). FIG. 21 illustrates an operator 250 using the portable control assembly 150 to control the excavator 14 and/or the grapple attachment 16 from the ground 252.

In addition, a portable control assembly similar to the portable control assembly 150 can be used to control other types of pipe handling and/or processing attachments. For example, the portable control assembly 150 can be configured to allow a single operator to control a pipe make-up operation or pipe break-out operation using an attachment described in U.S. Pat. No. 8,490,519 which is incorporated herein by reference in its entirety. In this embodiment, the portable control assembly can be configured to control the excavator and/or the attachment described in U.S. Pat. No. 8,490,519 to pick-up pipe and lay the pipes end-to-end for subsequent make-up operations by threading the pipes together and torqueing the joints.

In use, and assuming that welding is to be performed to attach the pipe ends, the ends 50, 53 of the two pipes 10, 12 are picked up by the attachment 16 under the control of an operator in the cab 24 or by an operator on the ground using the portable control assembly 150. The ends of the two pipes are then aligned with one another. The entire alignment process can be automated whereby via a push of a button, the operator can initiate an alignment sequence where the various movements of the excavator 14 and the attachment 16 are automatically controlled to achieve alignment. The automatic alignment can be aided by sensors, for example the laser sensors 110 and/or the linear transducers 111 of the pipe processing tool 18, to help achieve the alignment. Alternatively, or at any time after initiating an automatic alignment sequence, the operator can use the portable control assembly 150 to perform manual control of the movements of the excavator 14 and the attachment 16.

In addition to aligning the ends of the pipes, the circumferential shapes of the pipe ends need to generally match one another. So part of the alignment sequence includes a matching sequence, or a separate matching sequence can be initiated by the operator, to ensure the circumferential shapes of the pipe ends generally match. The matching sequence can be performed as described above by using the laser sensors 110 and/or the linear transducers 111 to determine the shapes of the pipe ends, and then suitably controlling the forces of the interchangeable deformation elements 88 to deform one or more of the pipe ends so they generally match one another. It is preferred that the matching sequence be automated with the operator being able to assume manual control via the pendent 154 or the main control assembly 152 if necessary.

Once alignment and a general shape match are achieved, the ends of the pipe are then welded together in a welding sequence. The welding sequence can be combined with the alignment and matching sequences above, or it can be a separately sequence initiated by the operator. During the welding sequence, the carrier(s) 102 and the welders mounted thereon are automatically controlled to perform the welding 360 degrees about the pipe joint. The rate of speed of the carrier(s) 102, the direction of movement of the carrier(s), the operation of the welder such as wire feed rate, can all be automatically controlled, based in part on feedback data from the laser(s) 110 and the linear transducer(s) 111 to achieve optimal welding. However, if necessary, the operator is able to assume manual control of the welding sequence via the pendent 154 or the main control assembly 152.

Once the pipes are welded, the attachment 16 can then be used to lower the pipe into a trench. Alternatively, for pie tie-in where the pipes are already located in a trench, the welding can occur in the trench.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A pipe processing tool, comprising:
a first deformation ring that has a closed configuration and an open configuration, in the closed configuration the first deformation ring forms a circle that can encircle a first pipe and in the open configuration the first deformation ring can be installed around or removed from the first pipe;
a first plurality of pipe deformation members disposed on, and circumferentially spaced from one another about, an inner circumference of the first deformation ring, each of the pipe deformation members faces radially inward toward a center of the first deformation ring when the first deformation ring is in the closed configuration;
each of the pipe deformation members is actuatable in a radial direction toward and away from the center of the first deformation ring in order to permit engagement with the first pipe;
each pipe deformation member is individually and separately actuatable from the other pipe deformation members;
one or more sensors mounted on the first deformation ring or on a main beam on which the first deformation ring is mounted to detect a circularity of an end of the first pipe or an end of a second pipe to be joined to the end of the first pipe while the first deformation ring is in the closed configuration around the first pipe; and
a control system connected to and receiving signals from the one or more sensors and connected to and controlling the pipe deformation members to actuate the pipe deformation members to change the circularity of the end of the first pipe using the pipe deformation members based on the detected circularity of the end of the first pipe or the end of the second pipe.

2. The pipe processing tool of claim 1, wherein the first deformation ring includes a 360 degree track disposed thereon, and further comprising a pipe processing mechanism disposed on the first deformation ring and movable along the 360 degree track.

3. The pipe processing tool of claim 2, wherein the pipe processing mechanism is configured to perform welding, coating, cutting, sealing, beveling or sand blasting, and the pipe processing mechanism is interchangeable with at least one other pipe processing mechanism that performs a different type of pipe processing.

4. The pipe processing tool of claim 2, wherein the track is disposed on a sideways facing surface of the first deformation ring.

5. The pipe processing tool of claim 1, wherein each pipe deformation member comprises a fluid actuated piston, and the fluid actuated piston of each of the pipe deformation members is hydraulically actuated.

6. The pipe processing tool of claim 1, wherein each of the pipe deformation members includes a force distribution member connected to a pipe engaging end thereof for distributing forces applied by the pipe deformation members.

7. The pipe processing tool of claim 1, further comprising a second deformation ring mounted adjacent to the first deformation ring, the second deformation ring has a closed configuration and an open configuration, in the closed configuration the second deformation ring forms a circle that can encircle a second pipe and in the open configuration the second deformation ring can be installed around or removed from the second pipe;
a second plurality of pipe deformation members disposed on, and circumferentially spaced from one another about, an inner circumference of the second deformation ring, each pipe deformation member of the second plurality of pipe deformation members faces radially inward toward a center of the second deformation ring when the second deformation ring is in the closed configuration;
each pipe deformation member of the second plurality of pipe deformation members is actuatable in a radial direction toward and away from the center of the second deformation ring in order to permit engagement with the second pipe; and
each pipe deformation member of the second plurality of pipe deformation members is individually and separately actuatable from the other pipe deformation members of the second plurality of pipe deformation members.

8. The pipe processing tool of claim 1, wherein the first deformation ring is adjustable vertically upward and downward.

9. The pipe processing tool of claim 1, wherein the circumferential positions of the pipe deformation members are adjustable.

10. The pipe processing tool of claim 1, wherein the first deformation ring includes a central support member and a pair of clamshell members pivotally attached to the central support member, and each of the clamshell members has a circumferential extent that is greater than 90 degrees.

11. A system, comprising:
a grapple attachment;
a pipe processing tool mounted on the grapple attachment, the pipe processing tool includes:
a first deformation ring that has a closed configuration and an open configuration, in the closed configuration the first deformation ring forms a circle that can encircle a first pipe and in the open configuration the first deformation ring can be installed around or removed from the first pipe;
a first plurality of pipe deformation members disposed on, and circumferentially spaced from one another about, an inner circumference of the first deformation ring, each of the pipe deformation members faces radially inward toward a center of the first deformation ring when the first deformation ring is in the closed configuration;
each of the pipe deformation members is actuatable in a radial direction toward and away from the center of the first deformation ring in order to permit engagement with the first pipe;
each pipe deformation member is individually and separately actuatable from the other pipe deformation members;
one or more sensors mounted on the first deformation ring or on a main beam on which the first deformation ring is mounted to detect a circularity of an end of the first pipe or an end of a second pipe to be joined to the end of the first pipe while the first deformation ring is in the closed configuration around the first pipe; and a control system connected to and receiving signals from the one or more sensors and connected to and controlling the pipe deformation members to actuate the pipe deformation members to change the circularity of the end of the first pipe using the pipe deformation members based on the detected circularity of the end of the first pipe or the end of the second pipe.

12. The system of claim 11, further comprising a portable control assembly disposed outside the operators cab, the portable control assembly is configured to control the excavator, the grapple attachment, and the pipe processing tool.

13. The system of claim 12, wherein the portable control assembly comprises a main control assembly that is configured to control the excavator and the grapple attachment, and a remote control pendent that is separable from the main control assembly and that controls the pipe processing tool.

14. The system of claim 11, further comprising an excavator with an arm, tracks, and an operator's cab, and the grapple attachment is mounted to the arm.

15. The system of claim 11, wherein the portable control assembly is configured to control: the tracks of the excavator, the arm, rotation of the operators cab about a vertical axis, movements of the first deformation ring between the closed configuration and the open configuration, and actuation of the pipe deformation members.

16. The system of claim 11, wherein the one or more sensors comprises one or more lasers.

17. The system of claim 11, wherein the first deformation ring is adjustable vertically upward and downward.

18. The system of claim 11, wherein the circumferential positions of the pipe deformation members are adjustable.

19. The system of claim 11, wherein the first deformation ring includes a central support member and a pair of clamshell members pivotally attached to the central support member, and each of the clamshell members has a circumferential extent that is greater than 90 degrees.

20. The system of claim 11, wherein the first deformation ring includes a 360 degree track disposed on a sideways facing surface thereof, and further comprising a pipe processing mechanism disposed on the first deformation ring and movable along the 360 degree track.

* * * * *